US008098728B2

(12) United States Patent
Winder et al.

(10) Patent No.: US 8,098,728 B2
(45) Date of Patent: *Jan. 17, 2012

(54) COMPRESSING AND DECOMPRESSING MULTIPLE, LAYERED, VIDEO STREAMS EMPLOYING MULTI-DIRECTIONAL SPATIAL ENCODING

(75) Inventors: Simon Winder, Seattle, WA (US); Matthew Uyttendaele, Seattle, WA (US); Charles Zitnick, III, Seattle, WA (US); Richard Szeliski, Redmond, WA (US); Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1644 days.

This patent is subject to a terminal disclaimer.

(21) Appl. No.: 11/182,144

(22) Filed: Jul. 15, 2005

(65) Prior Publication Data
US 2006/0031917 A1 Feb. 9, 2006

Related U.S. Application Data

(63) Continuation-in-part of application No. 10/910,077, filed on Aug. 3, 2004, now Pat. No. 7,561,620.

(51) Int. Cl.
*H04B 1/66* (2006.01)
*H04N 7/12* (2006.01)
*H04N 11/02* (2006.01)
*H04N 11/04* (2006.01)

(52) U.S. Cl. ........... 375/240.12; 375/240.01; 375/240.2; 375/240.03; 375/240.23; 375/240.24; 348/700; 382/233; 382/236; 382/250; 382/166

(58) Field of Classification Search .............. 375/240.12
See application file for complete search history.

(56) References Cited

U.S. PATENT DOCUMENTS

| 5,825,421 A * | 10/1998 | Tan ........................... 375/240.15 |
| 6,700,933 B1 * | 3/2004 | Wu et al. ................... 375/240.16 |
| 2006/0153304 A1 * | 7/2006 | Prakash et al. ........... 375/240.25 |

OTHER PUBLICATIONS

Lim, Jeong Eun, "A multiview sequnce CODEC with view scalability", Signal Processing: Image Communication vol. 19, Issue 3 Mar. 2004 pp. 239-256.*
U.S. Appl. No. 10/880,774, filed Jun. 28, 2004, Kang et al.
U.S. Appl. No. 10/879,327, filed Jun. 28, 2004, Zitnick et al.
U.S. Appl. No. 10/879,235, filed Jun. 28, 2004, Zitnick et al.

(Continued)

*Primary Examiner* — Jay Au Patel
*Assistant Examiner* — Jessica Prince
(74) *Attorney, Agent, or Firm* — Lyon & Harr, LLP; Richard T. Lyon

(57) ABSTRACT

A process for compressing and decompressing non-keyframes in sequential sets of contemporaneous video frames making up multiple video streams where the video frames in a set depict substantially the same scene from different viewpoints. Each set of contemporaneous video frames has a plurality frames designated as keyframes with the remaining being non-keyframes. In one embodiment, the non-keyframes are compressed using a multi-directional spatial prediction technique. In another embodiment, the non-keyframes of each set of contemporaneous video frames are compressed using a combined chaining and spatial prediction compression technique. The spatial prediction compression technique employed can be a single direction technique where just one reference frame, and so one chain, is used to predict each non-keyframe, or it can be a multi-directional technique where two or more reference frames, and so chains, are used to predict each non-keyframe.

10 Claims, 27 Drawing Sheets

OTHER PUBLICATIONS

U.S. Appl. No. 10/910,088, filed Aug. 3, 2004, Uyttendaele et al.

Buehler, C., M. Bosse, L. McMillan, S. Gortler, and M. Cohen, Unstructured lumigraph rendering, *Proceedings of SIGGRAPH 2001*, pp. 425-432.

Carceroni, R. L., and K. Kutulakos, Multi-view scene capture by surfel sampling: From video streams to non-rigid 3D motion, shape and reflectance, *Eighth International Conference on Computer Vision*, vol. II, pp. 60-67.

Carranza, J., C. Theobalt, M. Magnor, and H.-P. Seidel, Free-viewpoint video of human actors, *ACM Transactions on Graphics*, vol. 22, No. 3, pp. 569-577.

Chai, B.-B., S. Sethuraman, H. S. Sawhney, P. Hatrack, Depth map compression for real-time view-based rendering, *Pattern Recognition Letters*, 2004, vol. 25, No. 7, pp. 755-766.

Chang, C.-L., X. Zhu, P. Ramanathan, and B. Girod, Inter-view wavelet compression of light fields with disparity-compensated lifting, *SPIE Visual Communications and Image Processing,2003, Invited Paper*.

Chuang, Y.-Y., B. Curless, D. Salesin, and R. Szeliski, A Bayesian approach to digital matting, *Conf on Comp. Vision and Pattern Recognition*, 2001, vol. II, pp. 264-271.

Debevec, P.E., C. J. Taylor, and J. Malik, Modeling and rendering architecture from photographs: A hybrid geometry- and image-based approach, *Computer Graphics (SIGGRAPH'96)*, Aug. 1996, pp. 11-20.

Debevec, P.E., Y. Yu, and G. Borshukov, Efficient view-dependent image-based rendering with projective texture mapping, *Ninth Eurographics Rendering Workshop*, Vienna, Austria, Jun. 1998.

Gortler, S.J., R. Grzeszczuk, R. Szeliski, and M. F. Cohen, The lumigraph, *ACM SIGGRAPH Comp. Graphics Proceedings, Annual Conference Series*, pp. 43-54.

Grammalidis, N., M. G. Strintzis, Sprite generation and coding in multiview image sequences, *IEEE Transactions on Circuits and Sys. For Video Tech.*, Mar. 2000, vol. 10, No. 2, pp. 302-311.

Hall-Holt, O., and S. Rusinkiewicz, Stripe boundary codes for real-time structured-light range scanning of moving objects, *Eighth Int'l. Conf on Comp. Vision*, vol. II, pp. 359-366.

Heigl, B., R. Koch, M. Pollefeys, J. Denzler, L. Van Gool, Plenoptic modeling and rendering from image sequences taken by hand-held camera, *DAGM'99*, pp. 94-101.

Kanade, T., P. W. Rander, and P. J. Narayanan, Virtualized reality: constructing virtual worlds from real scenes, *IEEE MultiMedia Magazine*, Jan.-Mar. 1997, vol. 1, No. 1, pp. 34-47.

Krishnamurthy, R., B.-B. Chai, H. Tao, S.Sethuraman, Compression and transmission of depth maps for image-based rendering, *Int'l Conf on Image Processing*, 2001, vol. 3, pp. 828-831.

Levoy, M. and P. Hanrahan, Light field rendering, *ACM SIGGRAPH Comp. Graphics Proceedings, Annual Conference Series*, Aug. 1996, pp. 31-42.

Lim, J., K. N. Ngan, W. Yang, K. Sohn, A multiview sequence CODEC with view scalability, *Signal Processing: Image Communication*, 2004, vol. 19, pp. 239-256.

Pulli, K., M. Cohen, T. Duchamp, H. Hoppe, L. Shapiro, and W. Stuetzle, View-based rendering, *Eurographics Workshop on Rendering*, 1997, pp. 23-34.

Scharstein, D., and R. Szeliski, A taxonomy and evaluation of dense two-frame stereo correspondence algorithms, *Int'l. J. of Comp. Vision*, vol. 47, No. 1, pp. 7-42.

Seitz, S. M., and C. M. Dyer, Photorealistic scene reconstruction by voxel coloring, *CVPR'97*, Jun. 1997, pp. 1067-1073.

Shade, J., S. Gortler, L.-W. He, and R. Szeliski, Layered depth images, *Comp. Graphics (Siggraph '98) Proceedings*, Jul. 1998, pp. 231-242.

Szeliski, R., Scene reconstruction from multiple cameras, *Int'l Conf. on Image Processing (ICIP-2000)*, Vancouver, Sep. 2000, vol. I, pp. 13-16.

Tao, H., H. Sawhney, and R. Kumar, A global matching framework for stereo computation, *Eighth Int'l Conf. on Comp. Vision*, vol. I, pp. 532-539.

Torr, P., R. Szeliski, and P. Anandan, An integrated Bayesian approach to layer extraction from image sequences, *IEEE Trans. on Pattern Analysis and Mach. Intelligence*, 2001, vol. 23, No. 3, pp. 297-303.

Vedula, S., S. Baker, S. Seitz, and T. Kanade, Shape and motion carving in 6D, *Conf. on Comp. Vision and Patten Recognition*, vol. II, pp. 592-598.

Wexler, Y., A. Fitzgibbon, and A. Zisserman, Bayesian estimation of layers from multiple images, *Seventh European Conf. on Comp. Vision*, vol. III, pp. 487-501.

Wilburn, B., M. Smulski, H. K. Lee and M. Horowitz, The light field video camera, *SPIE Electronic Imaging: Media Processors*, vol. 4674, pp. 29-36.

Yang, J. C., M. Everett, C. Buehler, and L. McMillan, A real-time distributed light field camera, *Thirteenth Eurographics Workshop on Rendering*, 2002, pp. 77-85.

Zhang, L., B. Curless, and S. M. Seitz, Spacetime stereo: Shape recovery for dynamic scenes, *Conf on Comp. Vision and Pattern Recognition*, 2003, pp. 367-374.

Zhang, Y., and C. Kambhamettu, On 3D scene flow and structure estimation, *Conf. on Comp. Vision and Pattern Recognition*, 2001, vol. II, pp. 778-785.

Zhang, Z. A flexible new technique for camera calibration, *Technical Report: MSR-TR-98-71*, Microsoft Research, Redmond, WA.

Ziegler, G., H. Lensch, N. Ahmed, M. Magnor, and H.-P. Seidel, Multi-video compression in texture space, *IEEE International Conference on Image Processing (ICIP'04)*, 2004, (accepted for publication).

Ziegler, G., H. Lensch, M. Magnor, and H.-P. Seidel, Multi-video compression in texture space using 4D SPIHT, *IEEE Int'l. Workshop on Multimedia and Signal Processing, (MMSP'04)*, 2004, (accepted for publication).

\* cited by examiner

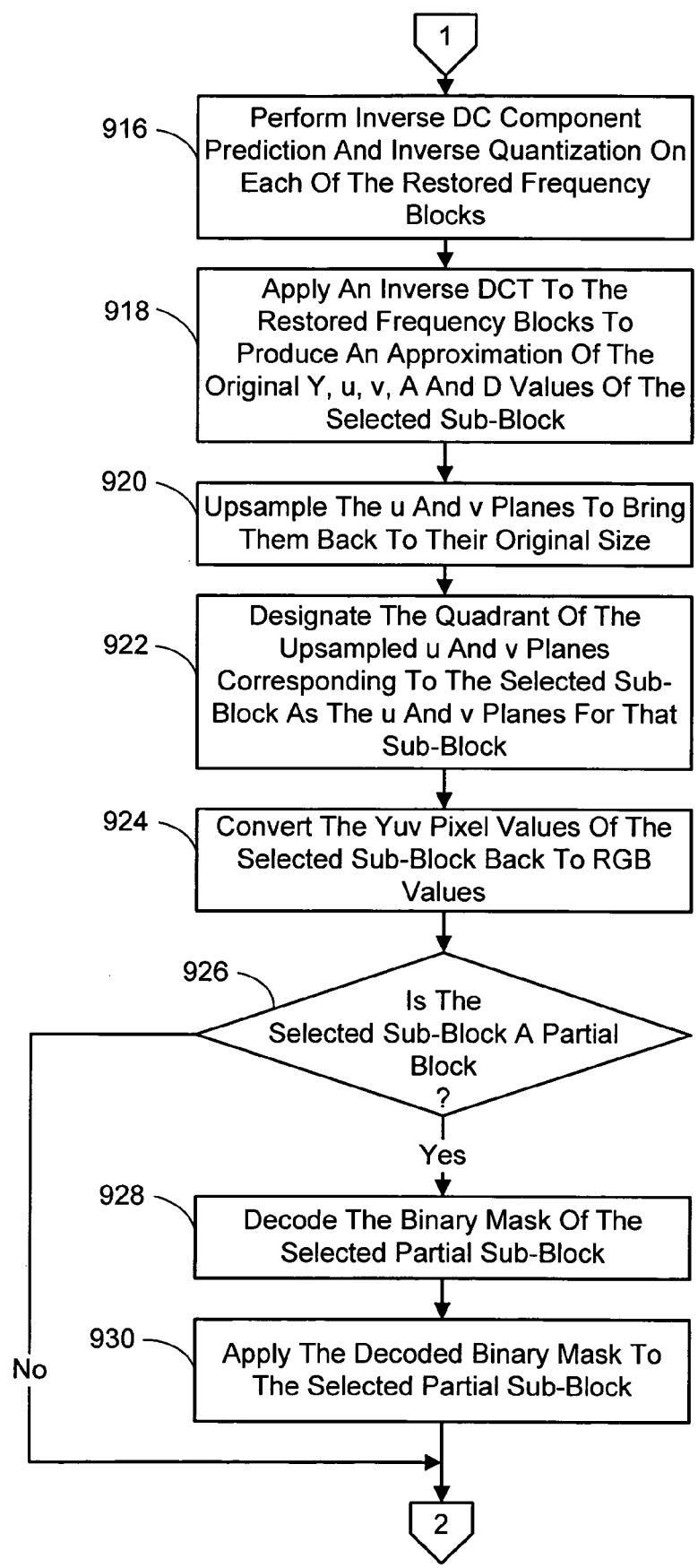

COMPRESSING AND DECOMPRESSING MULTIPLE, LAYERED, VIDEO STREAMS EMPLOYING MULTI-DIRECTIONAL SPATIAL ENCODING

CROSS-REFERENCE TO RELATED APPLICATIONS

This application is a continuation-in-part of a prior application entitled "A System And Process For Compressing And Decompressing Multiple, Layered, Video Streams Employing Spatial And Temporal Encoding" which was assigned Ser. No. 10/910,077 and filed Aug. 3, 2004 now U.S. Pat. No. 7,561,620.

BACKGROUND

BACKGROUND ART

For several years now, viewers of TV commercials and feature films have been seeing the "freeze frame" effect used to create the illusion of stopping time and changing the camera viewpoint. The earliest commercials were produced by using a film-based system, which rapidly jumped between different still cameras arrayed along a rail to give the illusion of moving through a frozen slice of time.

When it first appeared, the effect was fresh and looked spectacular, and soon it was being emulated in many productions, the most famous of which is probably the "bullet time" effects seen in the movie entitled "The Matrix". Unfortunately, this effect is a one-time, pre-planned affair. The viewpoint trajectory is planned ahead of time, and many man hours are expended to produce the desired interpolated views. Newer systems are based on video camera arrays, but still rely on having many cameras to avoid software view interpolation.

Thus, existing systems would not allow a user to interactively change to any desired viewpoint while watching a dynamic image-based scene. Most of the work on image-based rendering (IBR) in the past involves rendering static scenes, with two of the best-known techniques being Light Field Rendering and the Lumigraph. Their success in high quality rendering stems from the use of a large number of sampled images and has inspired a large body of work in the field. One exciting potential extension of this groundbreaking work involves interactively controlling viewpoint while watching a video. The ability of a user to interactively control the viewpoint of a video enhances the viewing experience considerably, enabling such diverse applications as new viewpoint instant replays, changing the point of view in dramas, and creating "freeze frame" visual effects at will.

However, extending IBR to dynamic scenes is not trivial because of, among other things, the difficulty (and cost) of synchronizing so many cameras and acquiring the images. One of the earliest attempts at capturing dynamic scenes involved 51 cameras arranged around a 5-meter geodesic dome. Another attempt used seven synchronized cameras distributed around a room looking towards its center to capture 3D human motion. Yet another involved the use of an 8×8 grid of cameras (each 320×240) for capturing a dynamic scene.

Compressing the video data to a workable size for transmission or storage, and then decompressing the compressed data in an efficient and quick manner with acceptable quality, is also a difficult problem. Compression is needed as even if only a few cameras are employed in capturing the video data, the amount of data is extremely large (e.g., on the order of 800 MB per second for 8 cameras at 15 fps). Essentially, the amount of data involved is too large to efficiently transmit over a computer network given current typical bandwidth resources. Further, storage of the data is problematic if using currently popular storage media. For example, the storage capability of a current DVD could be easily exceeded. Thus, compression of the video data is needed to make distribution practical. In addition, the compression scheme should allow the data to be recovered in substantially real-time in order to support the rendering of the captured scene from a viewer-selected viewpoint. Current video compression techniques can be employed but would not be efficient enough to provide the necessary compression ratio to facilitate distribution of the video data or its substantially real-time decompression. One recent attempt at compressing video streams from multiple cameras involved a proofing of concept for storing dynamic light fields. Namely, it was demonstrated that it is possible to synchronize six video cameras, and compress and store all the image data in real time. They have since hooked up 128 cameras. In another attempt, the high degree of redundancy inherent in multiple video streams depicting the same dynamic scene was exploited, especially as between the streams, to compress the data using a texture domain approach.

SUMMARY

The present invention is implemented within a system and process for compressing and decompressing multiple video streams depicting substantially the same dynamic scene in a different and efficient manner. To facilitate the explanation of the present system and process, the multiple video streams can be characterized as being video data that is made up of sequential sets of contemporaneous video frames. Each frame in a set depicts substantially the same scene but from different viewpoints. These viewpoints can form a grid or a row.

More particularly, this compression and decompression scheme involves designating one or more of the frames in each set of contemporaneous frames as keyframes. For each set of contemporaneous frames in time sequence order, each keyframe in the set is partially compressed and decompressed using a temporal, inter-frame technique. However, the remaining frames in each contemporaneous set, which are referred to as non-keyframes, are compressed and decompressed in part using a spatial prediction technique. The present invention is directed toward processes that can be used for the compression and decompression of the non-keyframe images.

In one embodiment of the present invention, the non-keyframes of each set of contemporaneous video frames are compressed using a multi-directional spatial prediction technique. In this technique at least two keyframes which are no more than a prescribed number of viewpoints away from the non-keyframe being compressed are employed as reference frames in the compression technique. These compressed frames can then be decompressed given the keyframes used as references.

In another embodiment of the present invention, the non-keyframes of each set of contemporaneous video frames are compressed using a combined chaining and spatial prediction compression technique. Chaining refers to each non-keyframe being compressed using one or more frames that have viewpoints immediately adjacent the non-keyframe as reference frames, regardless of whether they are keyframes or non-keyframes. In addition, whenever a non-keyframe is employed as a reference to encode another non-keyframe it is itself encoded using one or more other frames, exclusive of the non-keyframe using it as a reference, which have viewpoints immediately adjacent that of the non-keyframe reference. Thus, one or more chains of successively compressed frames are formed where each, except the first frame, has as its reference frame the frame immediately preceding it in the chain. More particularly, a chain of video frames is defined as an anchoring keyframe followed by two or more non-keyframes links such that each frame in the chain has a viewpoint that is immediately adjacent that of any preceding or succeeding frame in the chain. The spatial prediction compression technique employed can be a single direction technique where just one reference frame, and so one chain, is used to predict each non-keyframe, or it can be a multi-directional technique where two or more reference frames, and so chains, are used to predict each non-keyframe.

When decompressing a non-keyframe compressed using a combined chaining and spatial prediction compression technique, all the preceding frames in the chain are decoded first, starting with the anchoring keyframe in a reverse chaining process. Each of the non-keyframes in the chain are decompressed using the spatial prediction decompression technique applicable to the spatial prediction compression technique used to compress the non-keyframe—for example, via a multi-directional spatial decompression technique.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 9A-C are a flow chart diagramming a process for decompressing boundary layer data using an I-frame compression technique.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Interactive Viewpoint Video

The present system and process is used to compress and decompress interactive viewpoint video data, or other data having the same video frame form. In general, interactive viewpoint video is video in which a user can watch a dynamic scene while manipulating (freezing, slowing down, or reversing) time and changing the viewpoint at will. This video is generated using a relatively small number of cameras to simultaneously capture multiple views of a scene from different viewpoints to produce a set of contemporaneous frames of the video. This is done on a continuing basis to produce a sequence of these frame sets, which are then characterized using unique two-layer frame representations, to form the video. While the generation of the interactive viewpoint video is beyond the scope of the present system and process, it is the subject of a co-pending application entitled "Interactive Viewpoint Video System And Process Employing Overlapping Images Of A Scene Captured From Viewpoints Forming A Grid", which was filed on Mar. 31, 2005 and assigned Ser. No. 11/097,542.

In general, the co-pending application describes an interactive viewpoint video capture system which includes a bank of video cameras, arranged in a grid. In addition, the cameras have a convergent configuration such that each points generally toward the same target object or area in a scene with each camera's field of view overlapping the field of view of the adjacent camera or cameras by a prescribed amount (e.g., 30 degrees horizontal field of view per camera with relative rotation of 4-8 degrees between two adjacent cameras). The orientation of the cameras in relation to the target object or area can vary depending on the desired results. In other words, the distance each camera is away from the target object or area can vary. Thus, the grid of cameras need not be planar.

Figure 2A:
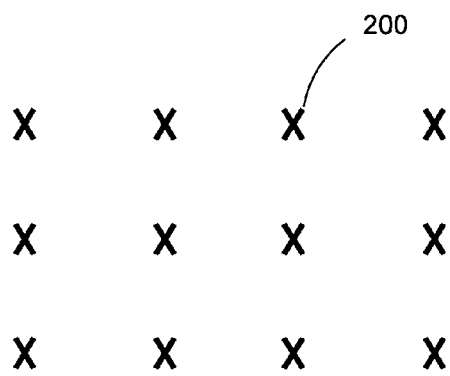
FIGS. 2(a)-(d) are diagrams showing a regular rectangular grid in FIG. 2(a), an irregular rectangular grid in FIG. 2(b), a regular triangular grid in FIG. 2(c) and an irregular triangular grid in FIG. 2(d).
Figure 2B:
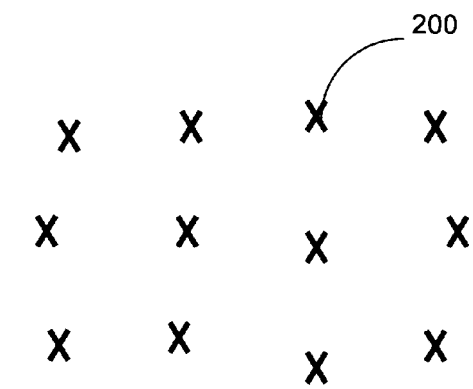
Figure 2C:
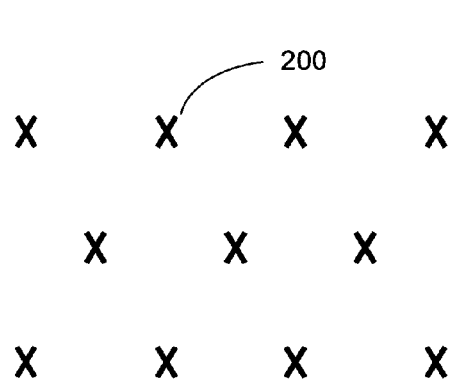
Figure 2D:
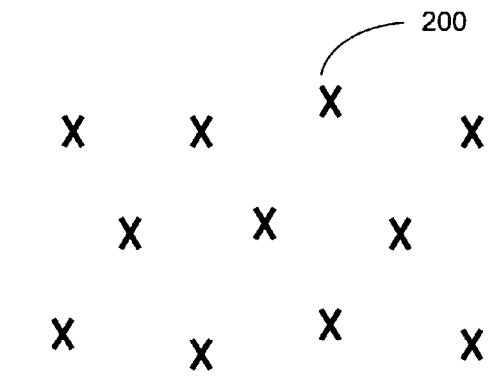

Further, the grid of cameras can be rectangular or triangular, and the placement pattern can be regular or irregular. For example, FIG. 2(a) illustrates a rectangular configuration with a regular placement pattern. In other words, when looking toward the center of the grid, the camera viewpoints 200 indicated by the X's appear to be lined up in straight columns and rows. FIG. 2(b) exemplifies a rectangular configuration with an irregular placement pattern. In this case, when looking toward the center of the grid, the viewpoints 200 are generally in columns and rows, but each viewpoint may be skewed so that they do not line up perfectly. FIG. 2(c) illustrates a triangular configuration with a regular placement pattern. Here, when looking toward the center of the grid, the viewpoints 200 appear to be lined up in horizontal rows, but diagonal columns. FIG. 2(d) exemplifies a triangular configuration with an irregular placement pattern. In this case, when looking toward the center of the grid, the viewpoints 200 are generally in the aforementioned horizontal row and diagonal column pattern, but each may be skewed so that they do not line up perfectly. It is noted that the number of camera viewpoints shown in the figures is arbitrary, and there can be more or less as desired.

This foregoing camera grid arrangement results in the user being able to view the scene from any vantage point along a surface connecting the camera viewpoints. Thus, it would appear to users as if they can pan and tilt across the scene, bounded only by the edges of the grid.

Another key feature of the interactive viewpoint video capture system is the real-time acquisition of synchronized video streams from the cameras. To accomplish this task, equipment capable of receiving and synchronizing the individual feeds from the cameras is advantageous, as is equipment for storing the synchronized video stream data. For example, real-time synchronization and storage of all the input videos can be handled by a series of concentrator units and a bank of hard drives. Each concentrator synchronizes the feed from a prescribed number of cameras (e.g., 4) and pipes the uncompressed video streams into the bank of hard drives through a fiber optic cable. The concentrators are synchronized (e.g., via a FireWire cable) to ensure all the video feeds are synchronous. In an alternative realization of the system, each camera could have its own recording device such as DV tape, VHS tape, etc. The video may then be transferred to hard disk after recording.

In addition to the capture and storing of video streams, the interactive viewpoint video capture system also includes a camera calibration program. The cameras are calibrated before every capture session to obtain all the camera attributes necessary for 3D reconstruction. These attributes including both geometric parameters (e.g., intrinsic and extrinsic camera parameters) and photometric parameters (e.g., exposure, white balance, vignetting). The camera parameters are stored and provided, along with the video streams, to the interactive viewpoint video generation program that will be described shortly.

The aforementioned two layer representations of each frame include a main layer and a boundary layer. The main layer has pixels exhibiting background colors and background disparities associated with correspondingly located pixels of depth discontinuity areas of the frame being represented, as well as pixels exhibiting colors and disparities associated with correspondingly located pixels of the frame not found in these depth discontinuity areas. The boundary layer is made up of pixels exhibiting foreground colors, foreground disparities and alpha values associated with the correspondingly located pixels of the depth discontinuity areas in the frame. The depth discontinuity areas correspond to prescribed sized areas surrounding depth discontinuities found in the frame. It is this two-layer frame data that the present invention is used to compress and decompress in a combined temporal and spatial manner.

The following sections will present details of the present compression and decompression (codec) system and process. A computing environment suitable for implementing the invention is presented first. This is followed by a description of the codec itself.

1.1 The Computing Environment

Figure 1:
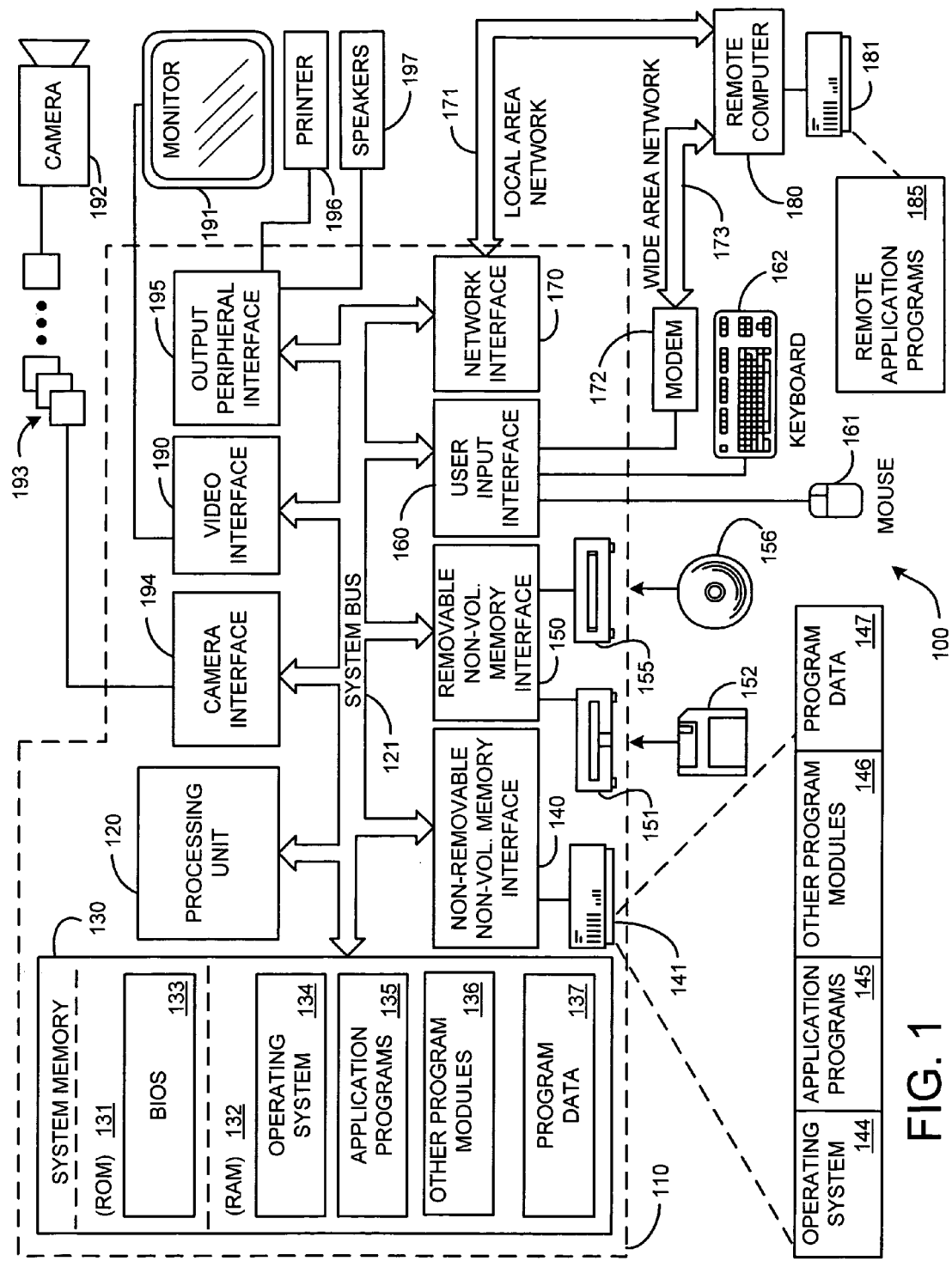
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer-readable storage media includes both volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the interactive viewpoint video system hardware, program module architecture and the modules themselves.

1.2.1 Compression

The previously described two layer frame data will represent a significant amount of data (e.g., on the order of 800 MB uncompressed for 8 cameras at 15 fps recording for 1 sec). The compression scheme according to the present invention is used to reduce this large amount of data to a manageable size and the decompression is designed to support fast playback. Because each camera is capturing some common parts of the same scene, an opportunity exists to compress the data by exploiting the between-camera (i.e., spatial) redundancies, as well as temporally between successive frame sets. In general, the temporal compression aspects involve temporal prediction using motion compensated estimates from the preceding frame, while the spatial aspects involve spatial prediction using a reference camera's texture and disparity maps transformed into the viewpoint of a spatially adjacent camera. The differences are then coded between predicted and actual frames using a novel transform-based compression scheme that can simultaneously handle texture and disparity/depth data.

More particularly, the present codec compresses two kinds of information: RGBD data for the main layer of each frame (where the RGB refers to the red, green and blue color intensity values of each pixel as is conventional and D is the pixel disparity or depth) and RGBAD alpha-matted data for the boundary layer of the frame (where A is the pixel alpha or opacity value). For the former, both non-predicted (for I-frames) and predicted (for P-frames) compression is used, while for the latter, only non-predicted I-frames are used because the boundary layer data compresses extremely well owing to its sparseness and it is difficult to employ predictive coding due to the large changes in this boundary data between viewpoints.

Figure 3:
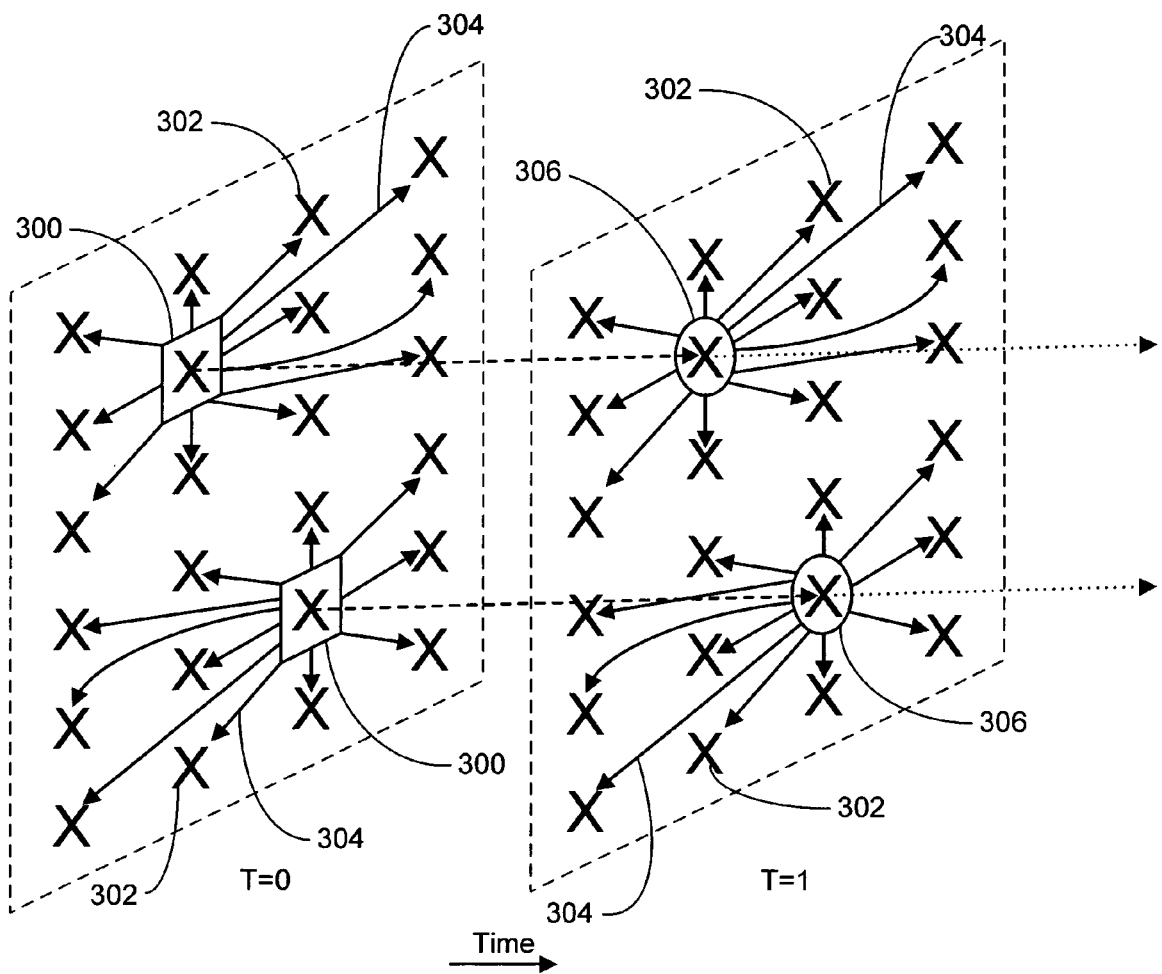
FIG. 3 is a block diagram illustrating how a main layer of each set of contemporaneously captured frames of the multi-stream video data are encoded using a hybrid temporal and spatial compression scheme.

FIG. 3 illustrates how the main layer is coded and demonstrates the present hybrid temporal and spatial prediction scheme. Of the 24 camera viewpoints arranged in a grid (which in this example is a 4×6 regular rectangular grid), two keyframe camera views 300 are selected. The keyframe camera views 300 were chosen in tested embodiments of the present compression technique such that no non-keyframe camera view 302 was more than two camera positions away from a keyframe camera. Further, if after the keyframes 300 are chosen, a particular non-keyframe 302 could be associated with either one of two keyframes and still fall within the prescribed number of camera position away from the keyframes, the closer keyframe is associated with the non-keyframe. If the same situation exists and either keyframe 300 is the same distance away, then the keyframe which best predicts the non-keyframe 302 measured in sum squared error is associated. Thus, in the example of FIG. 3, the camera viewpoint in the second row-second column of the grid was chosen as one of the keyframes 300, and the camera viewpoint in the fifth row-third column was chosen as another keyframe 300 to achieve this result. All the adjacent non-keyframes 302 were associated with one of them as shown in FIG. 3 by the lines 304 connecting them.

A different compression procedure is used when compressing the keyframes in comparison to the adjacent non-reference camera views. Referring again to FIG. 3, in regard to the keyframes 300, the texture (RGB) and disparity (D) data is initially compressed using the aforementioned non-predictive I-frame compression technique (I), as indicated previously. These I-frames are shown in FIG. 3 as an "X" surrounded by a box (in the example group of frames at T=0 in FIG. 3). The non-keyframe camera views 302 ($P_s$) are compressed using spatial prediction from nearby reference views. These non-keyframe viewpoints are shown in FIG. 3 as "Xs". This scheme was chosen because it minimizes the amount of information that must be decoded when data from adjacent camera pairs is selectively decompressed in order to synthesize novel views. For the next frame set in time (T=1 in the FIG. 3 example), motion compensation is used and the error signal is coded using a transform-based technique to obtain the temporal predicted frames 306 ($P_t$) for each I frame. These temporal predicted frames are shown in FIG. 3 as an "X" surrounded by a circle. In addition, the aforementioned predictive spatial compression is used to encode each non-keyframe view 302 in the new frame set under consideration based on a decoded version of a close-by $P_t$ frame 306. Thus, when decoding, the $P_t$ frame 306 is decoded first and then the $P_s$ 302 frames in the same frame set can be decoded using the $P_t$ frame. The foregoing compression scheme allows for fast decoding and decompression.

It is noted that the number of camera viewpoints and their grid arrangement shown in FIG. 3 is exemplary only. There can be more or less viewpoints, and the grid configuration could be different as well (e.g., irregular rectangular, regular triangular, or irregular triangular).

A more detailed description of the various aforementioned compression schemes will now be presented.

1.2.1.1 Compression of Main Layer Keyframes Using I-Frames

As described previously, each component frame in each set of contemporaneously captured frames making up a "frame" of the interactive viewpoint video data is represented by a main layer comprising RGBD pixel values and a boundary layer comprising RGBAD pixel values. In addition, it was stated previously that the main layer keyframes are initially and periodically thereafter compressed using a non-predictive I-frame technique. This section describes that technique.

Figure 4A:
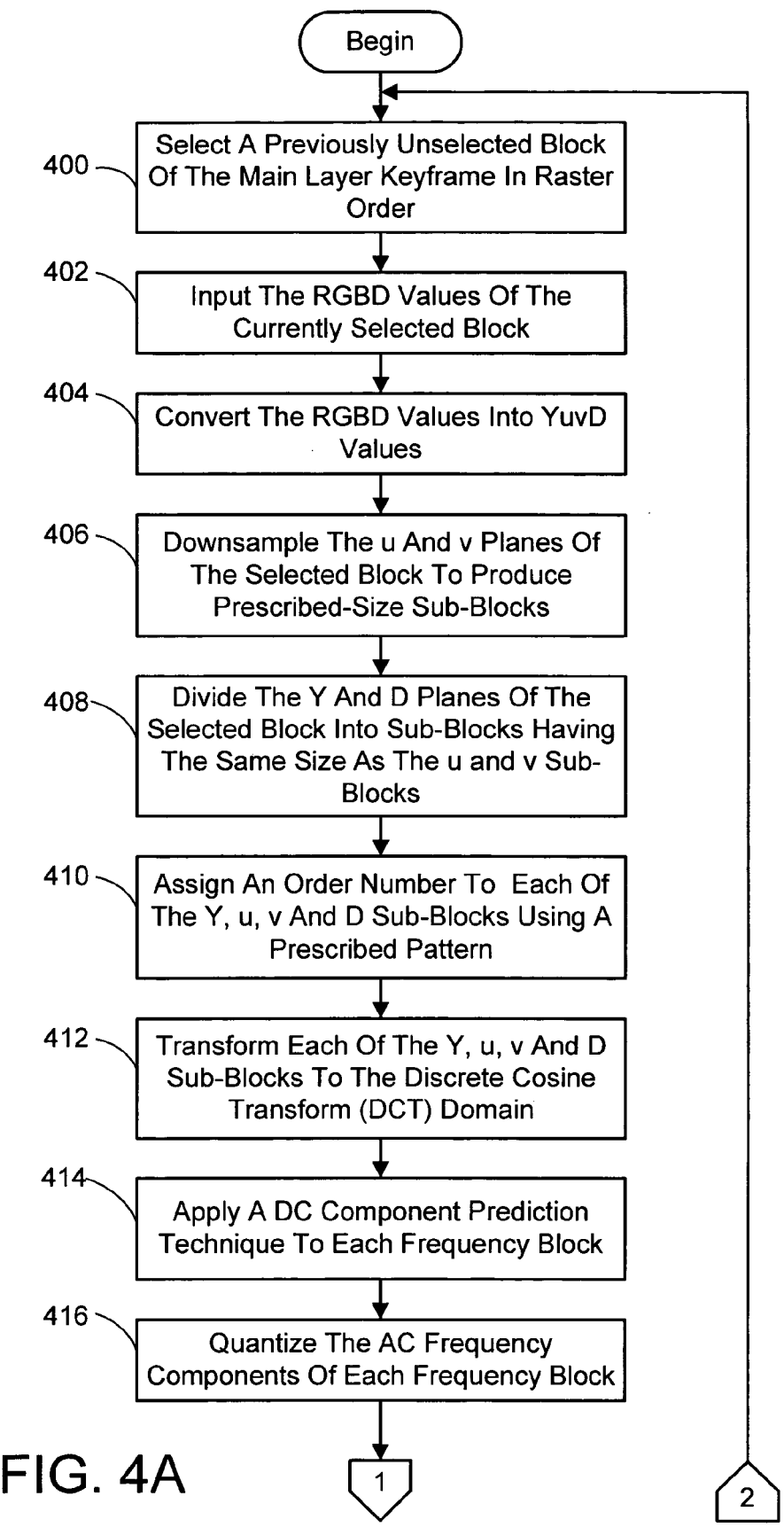
FIGS. 4A and 4B are a flow chart diagramming a process for compressing main layer keyframes using a non-predictive I-frame compression technique.
Figure 4B:
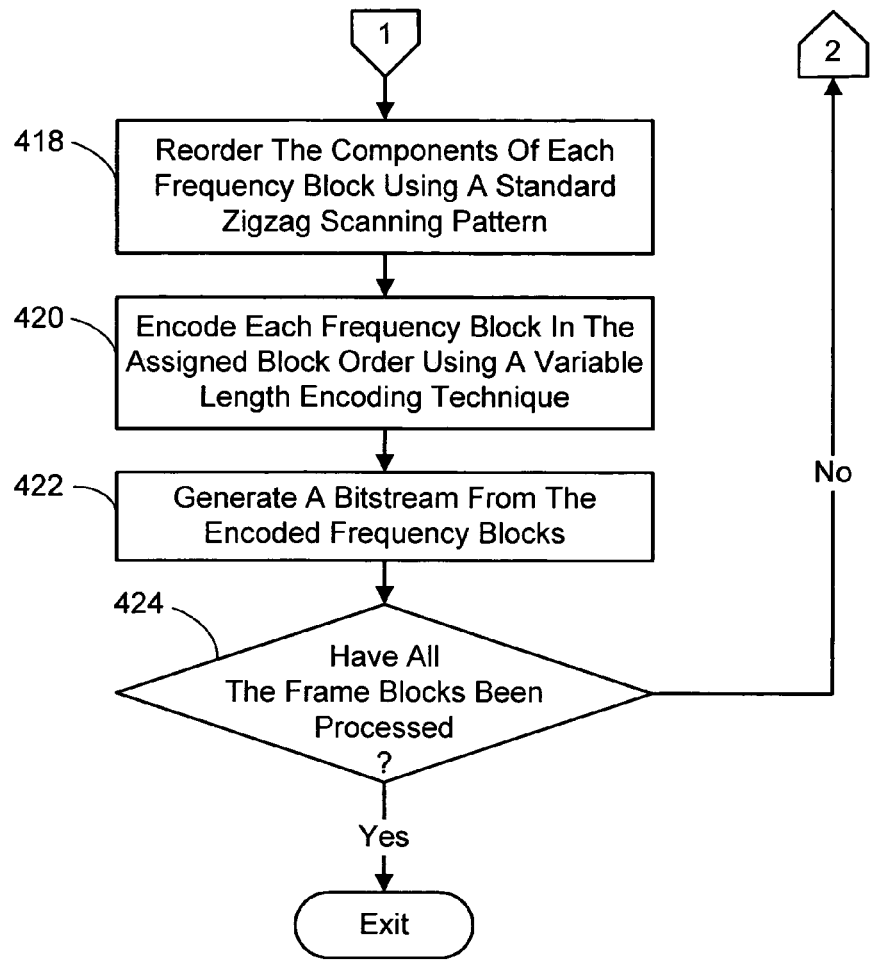

Referring to FIGS. 4A-B, the first action 400 in the non-predictive I-frame compression process is to select a previously unselected block of the main layer keyframe in raster order. In tested embodiments of this process, a 16×16 pixel block was used. However, other block sizes could be used as well. It is also noted that while a raster order was used in the tested embodiments, other block selection orders could be employed instead.

The RGBD values of the currently selected block are input (process action 402) and converted into Yuv values using standard methods (process action 404). In addition, the u and v planes of the selected block are downsampled to produce prescribed-size sub-blocks (process action 406). In tested embodiments, the u and v planes were downsampled by a factor of two to produce an 8×8 pixel u sub-block and an 8×8 pixel v sub-block. Still further, the Y and D planes of the selected block are divided into sub-blocks that are the same size as the u and v sub-blocks (process action 408). In tested embodiments these planes were divided into four 8×8 quadrant sub-blocks.

Each of the Y, u, v and D sub-blocks is assigned an order number via a prescribed pattern (process action 410). In tested embodiments, the prescribed pattern involved starting with the Y plane and assigning order numbers 1 through 4, respectively, to the Y sub-blocks in raster order. The u sub-block is assigned number 5 and the v sub-block is assigned number 6. Finally, the sub-blocks of the D plane are assigned order numbers 7-10 in raster order. It is noted, however, that other ordering patterns can be used.

Each of the Y, u, v and D sub-blocks is next transformed to the Discrete Cosine Transform (DCT) domain (process action 412). In tested embodiments, an integer approximation of the DCT technique was employed to effect the transformation. The result of the transformation is a sequence of 8×8 blocks of frequency components. A DC component prediction technique is applied to each frequency block (process action 414). This involves replacing the DC component in each frequency block with a value representing the difference between a predicted DC component value and the actual value. This DC prediction was accomplished in tested embodiments using a switched DC prediction technique similar to the one specified in the MPEG4 standard, except that a pre-defined fixed quantization level is employed. The particular quantization level employed is application specific and is chosen to strike a balance between the quality of the decompressed frame and the number of bits needed to represent it. The purpose of the DC prediction action is to convert what typically would have been a relatively large DC component value requiring many bits to encode, into a value that is near zero, if the DC values of neighboring frequency blocks of the same plane are close to the same original value.

Next, in process action 416, the frequency components of each frequency block (except the DC component) are quantized to eliminate small noise-level values and reduce the amount of data that needs to be encoded. The ITU-T video coding standard H.263 quantization approach was employed in the tested embodiments. Each frequency block is then encoded in accordance with the previously assigned block order using a standard variable length encoding technique. In tested embodiments, this involved first reordering the components of each block using a standard zigzag scanning pattern (process action 418) and then encoding them using a standard I-block variable length coding technique (process action 420), such as the MPEG4 Huffman encoding procedure.

A bitstream is generated from the encoded frequency values of the frequency blocks (process action 422). In tested embodiments, a modified version of the MPEG4 Coded Block Pattern (CBP) data structure was employed for this purpose. More particularly, a CBP header field is formed to include four sections—namely CBPY, CBPu, CBPv and CBPD sections. These sections correspond to the portion of the encoded data representing the Y, u, v and D planes, respectively. Essentially, each CBP"x" section indicates to the decoder if the frequency blocks representing the sub-blocks of a plane have any non-zero AC frequency components. The CBP"x" coding is the same as used in MPEG4 for the CBPY, CBPu, CBPv sections. As for the CBPD section, which is unique to the present invention, the coding employed for the CBPY section is adopted. The CBP header is followed by the encoded frequency components, except that in cases where all the AC components of a frequency block are zeros, only the DC difference value is included. Thus, the decoder can use the appropriate CBP"x" section of the CBP header to determine if there are any encoded AC frequency components for a particular block included in the data.

Process actions 400 through 422 are repeated 424 until all the blocks are encoded, at which time the compression process ends for that frame. It is noted that each of the foregoing process actions could alternately be performed on each block of the frame being compressed before moving to the next action, rather than completing all the actions on a block by block basis.

The associated decompression process for a main layer keyframe encoded via the foregoing process will be described in the decompression section later in this description.

1.2.1.2 Compression of Main Layer Keyframes Using P-Frames

For main layer keyframes in the contemporaneous frame sets falling between the above-described I-frames, the predictive phase of a conventional inter-frame compression technique is employed. For example, tested embodiments used the P-frame generation approach of the MPEG4 standard.

The only modification to this approach was the addition of the disparity values (D) since the main frame pixel data included this data. The D data is added in the same way as it was in the I-frame procedure described previously in that it is handled just like the Y data.

1.2.1.3 Compression of Non-Keyframe Main Layers

For main layer frames in each contemporaneous frame set that are not chosen as keyframes, a spatial prediction compression technique is used to compress them as mentioned earlier. In general, to carry out spatial prediction, the disparity data from a nearby keyframe is used to transform both the texture and disparity data into the viewpoint of the non-keyframe being compressed. This results in an approximation of the non-keyframe's data, which is then corrected by sending compressed difference information. Thus, the keyframes act as reference views for compressing the adjacent non-keyframes. The occlusion holes created during the camera view transformation are treated separately and this missing texture is coded without prediction and indicated by an alpha-mask. This gives clean results that could not be obtained with a conventional block-based P-frame codec.

Figure 5A:
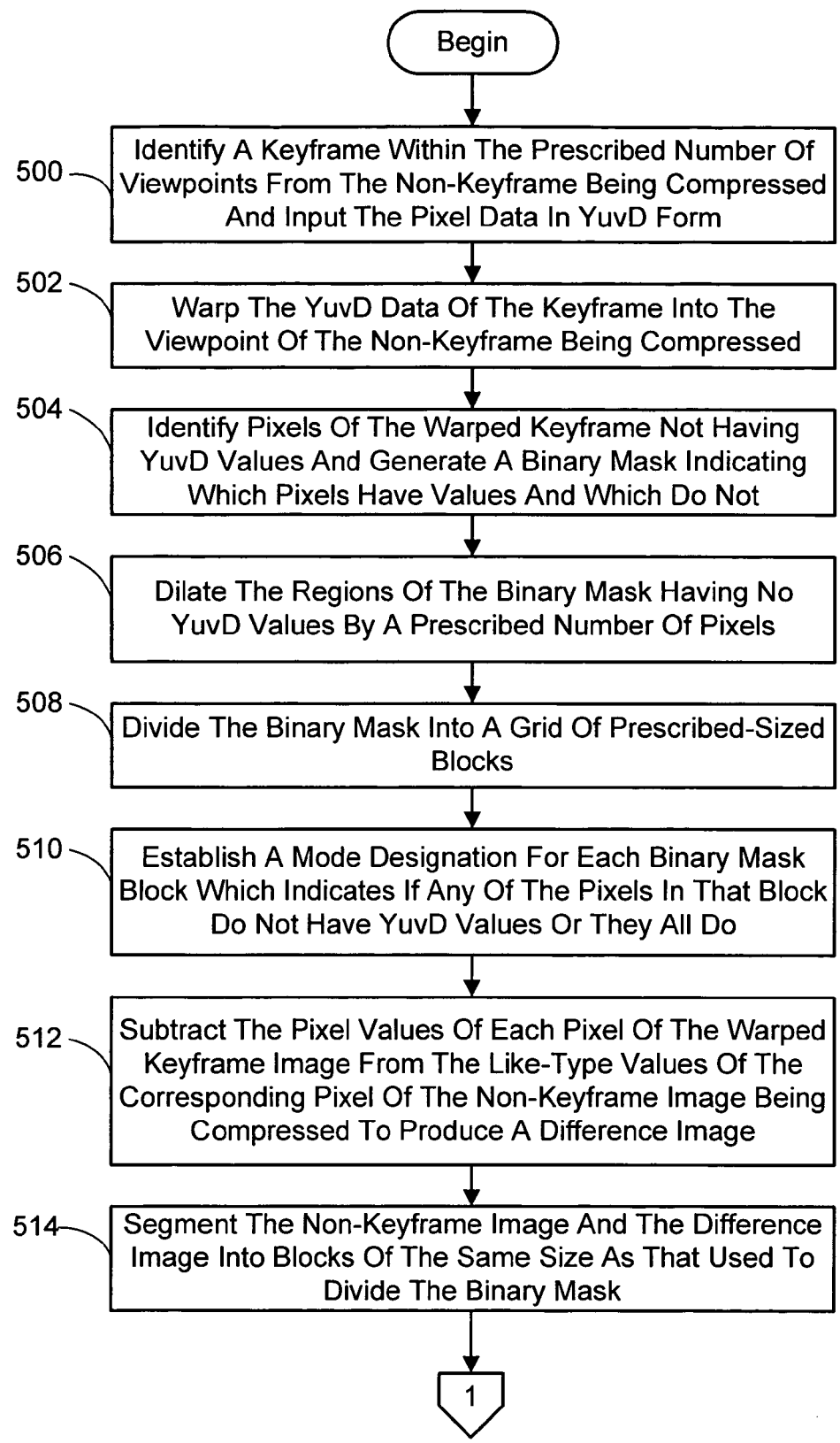
FIGS. 5A and 5B are a flow chart diagramming a process for compressing main layer non-keyframe images using a predictive spatial compression technique.
Figure 5B:
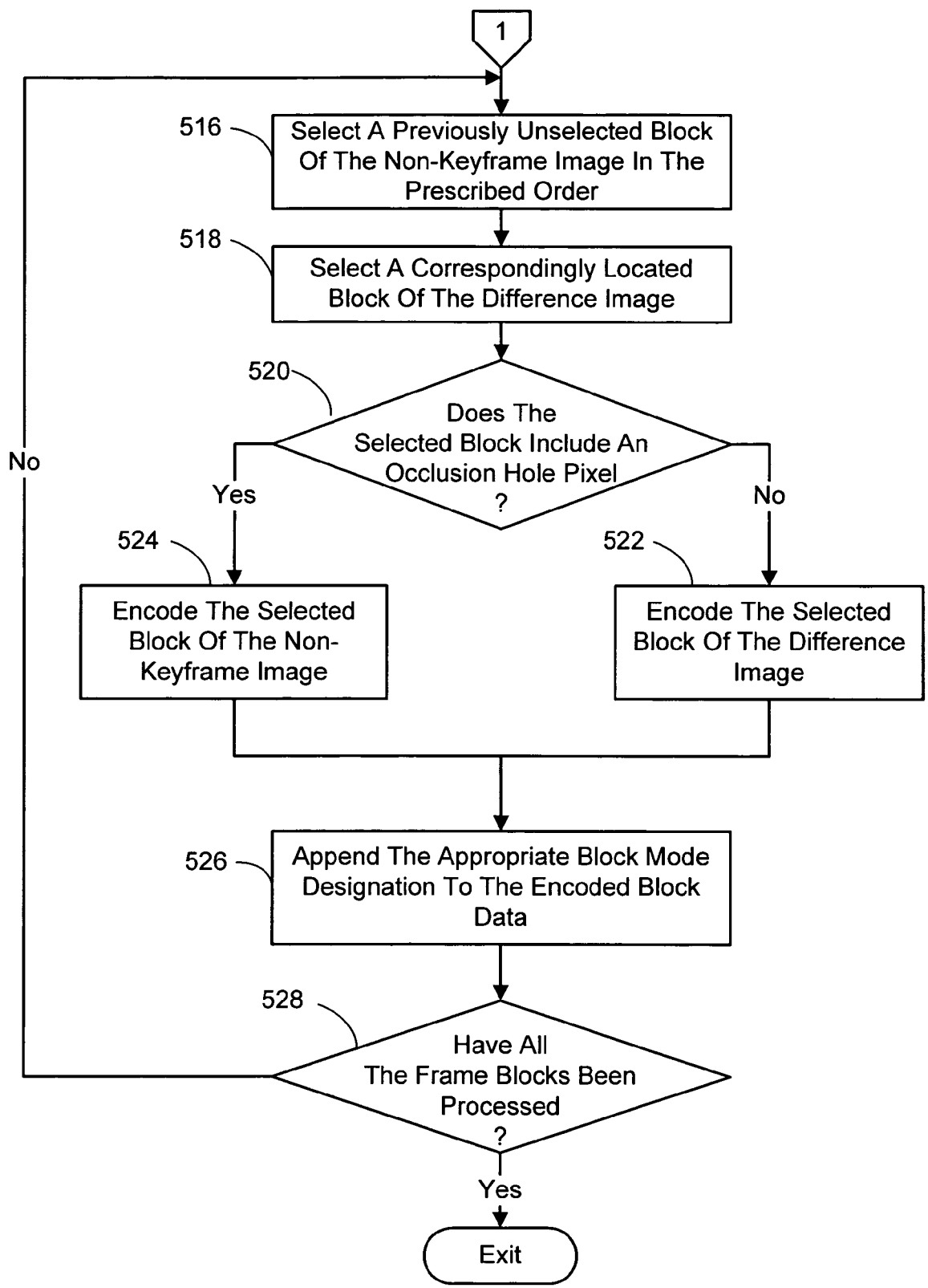

The spatial compression procedure will now be described in more detail as it pertains to each non-keyframe image in each of the aforementioned sets of contemporaneous frames. Referring to FIGS. 5A-B, a keyframe within a prescribed number of viewpoints from the non-keyframe being compressed is identified, and its pixel data in YuvD form, is input (process action 500). The disparity data (D) of the identified keyframe, and the camera parameters of the cameras used to capture the keyframe and the non-keyframe being compressed, are then used to transform both the texture and disparity data (YuvD) into the viewpoint of the non-keyframe being compressed (process action 502). It is noted that the camera parameter data is computed as part of the acquisition of the multiple video streams used to produce the sequential sets of contemporaneous frames and stored for used by the present compressing module, as well as the decompressing and rendering modules. The process used to "warp" the main layer of the keyframe to the viewpoint of the non-keyframe being compressed is accomplished using conventional methods. However, in tested embodiments of the present invention, a warping procedure described in a co-pending application entitled "A Real-Time Rendering System And Process For Interactive Viewpoint Video That Was Generated Using Overlapping Images Of A Scene Captured From Viewpoints Forming A Grid", which was filed on Mar. 31, 2005 and assigned Ser. No. 11/097,549, was employed for this purpose.

It is also noted that it will often be the case that in warping the keyframe image, some portions of the scene visible from the viewpoint of the non-keyframe image are not visible from the viewpoint of the keyframe image. This being the case, the warped keyframe image will exhibit occlusion holes—i.e., pixels for which there are no YuvD values available. In order to prevent the encoded frame from exhibiting occlusion holes, the following procedure is used. In process action 504, pixels of the warped keyframe not having YuvD values are identified and a binary mask is generated, which for each pixel location has one binary value (e.g., 1) if YuvD pixel values are available and the other binary value (e.g., 0) if no YuvD values exist. The regions of the binary mask indicating there are no YuvD values available are then dilated by a prescribed number of pixels (e.g., 1 in tested embodiments) in process action 506. This is done to compensate for noise in the warping process that might otherwise cause occlusion holes to remain in the compressed frame. Next, the binary mask is divided into a grid of prescribed-sized blocks (process action 508). In tested embodiments, 16×16 pixel blocks were employed. A mode designation is then established for each block, which indicates if any of the binary mask "pixels" in that block have the second binary value associated with an occlusion hole (process action 510). In tested embodiments, a first binary value (e.g., 1) was used to indicate that a block had occlusion hole pixels in it and the second binary value (e.g., 0) was used to indicate there were no hole pixels.

Meanwhile, the pixel values of each pixel of the warped keyframe image are subtracted from the like-type values of the corresponding pixel of the non-keyframe image being compressed, to produce a difference image (process action 512). The non-keyframe image and the difference image are then segmented in blocks of the same size as that used to divide up the binary mask (process action 514), and in a prescribed order (e.g., raster order in tested embodiments) each block in each image is compressed. More particularly, an unselected block of the non-keyframe image is selected in the prescribed order (process action 516). In addition, a correspondingly located block of the difference image is selected (process action 518). It is then determined if the selected block is designated as including an occlusion hole pixel or not, using the previously established designation mode for the block (process action 520). The selected block of the difference image is encoded using a modified version of the I-frame compression technique described previously in connection with the compression of certain keyframes, if it is found that the block is designated as not including any occlusion hole pixels (process action 522). These modifications involve skipping the DC prediction step since the DC components of the difference image will be small anyway. In addition, instead of using the standard encoding tables to encode the DC component (such as the MPEG4 Huffmann DC frequency component tables), the encoding tables meant for encoding the AC frequency components are used instead. Other than these changes the procedure is the same.

Alternately, if it is found that the block is designated as including occlusion hole pixels, the selected block of the non-keyframe image is encoded using a different modified version of the I-frame compression technique described previously in connection with the compression of the keyframes (process action 524). The modification in this case involves changing the DC prediction step of the compression process. When a non-keyframe is compressed in the manner described above, the decoded image will likely include some blocks taken directly from the non-keyframe image, rather than predicted from a close-by keyframe. These direct blocks are the blocks where an occlusion hole exists in the warped keyframe image. As will be described shortly, the decoding process for a direct block involves an inverse DC frequency component prediction step. As described previously in connection with compressing certain keyframes, DC frequency component prediction involves using DC component values from neighboring blocks to create a difference value that takes the place of the DC component. In the inverse step, the restored DC components of preceding blocks are used to restore the DC component of a block being decoded. However, in the compression scenario described above for the non-keyframe images, the preceding blocks may have been generated from the difference image as they did not include any occlusion hole pixels. This being the case, when restored, the frequency blocks will have the small DC frequency component associated with the transformed difference image. Thus, a problem exists in that the small DC frequency components associated with the transformed difference image blocks cannot be used effectively in the DC prediction step when compressing a direct block from the non-keyframe image. Additionally, adjacent blocks in the non-keyframe image cannot be used for DC component prediction purposes as they may not be associated with occlusion hole in the warped keyframe and so will not exist in the compressed image. The solution is to modify the previously-described I-frame compression technique such that when a block taken directly from the non-keyframe image being compressed is used, a mid-range DC frequency component value is used instead of the actual DC component from adjacent blocks when performing the DC component prediction step. This is if the adjacent block is not also a direct block. If it is a direct block, then the restored DC component can be used as it normally would in the compression procedure. Thus, as will be described shortly, when the compressed non-keyframe image is decompressed, it can use the mode designations, which are included in the compressed data, to identify which blocks are direct blocks. For direct blocks, it employs a modified I-frame decompression that uses prescribed mid-range DC frequency component values in the inverse DC component prediction step if an adjacent block needed in the procedure is not a direct block as well.

Regardless of whether the compressed block is produced from a direct block or a difference image block, in process action 526, the appropriate block mode designation is appended to the compressed block data. It is then determined if all the blocks of the non-keyframe image being compressed have been processed (process action 528). If not, then process actions 516 through 528 are repeated until all the blocks are encoded, at which time the compression process ends for the non-keyframe under consideration.

1.2.1.3.1 Multi-Directional Spatial Prediction

Compression of non-keyframe main layers can alternately be performed using a multi-directional spatial prediction technique. While heretofore the spatial prediction has involved using just one keyframe as a reference, this need not be the case. In multi-directional spatial prediction, additional keyframes may be established within the grid such that each non-keyframe is within the prescribed number of viewpoints from two or more keyframes. Then, the compression of the non-keyframes is performed as described previously, except that it is performed using two or more keyframes within the prescribed number of viewpoints from the non-keyframe being compressed.

Figure 10:
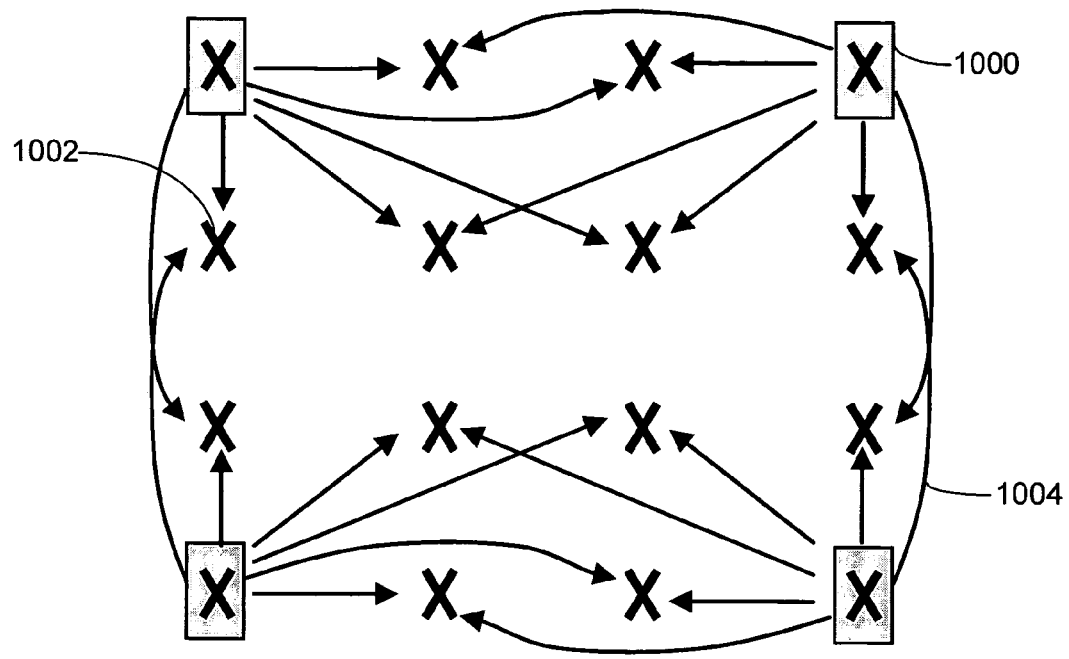
FIG. 10 is a diagram illustrating one embodiment of a keyframe placement configuration for a group of contemporaneously captured frames making up a "frame" of the interactive viewpoint video, which were captured in a regular 4×4 rectangular viewpoint grid, and where multi-directional spatial prediction is employed.

FIG. 10 illustrates the possible keyframe placement for a group of contemporaneously captured frames making up a "frame" of the interactive viewpoint video, which were captured in a regular rectangular viewpoint grid configuration (specifically, a 4×4 grid). In this example, the boxed X's identify the viewpoints that are designated as keyframes 1000 and the prescribed number of viewpoints that a non-keyframe 1002 can be from a keyframe for prediction purposes is two. The lines 1004 indicate which keyframes 1000 are used to predict which non-keyframes 1002. Note that each non-keyframe 1002 will be predicted by two separate keyframes 1000 in this example.

Figure 11:
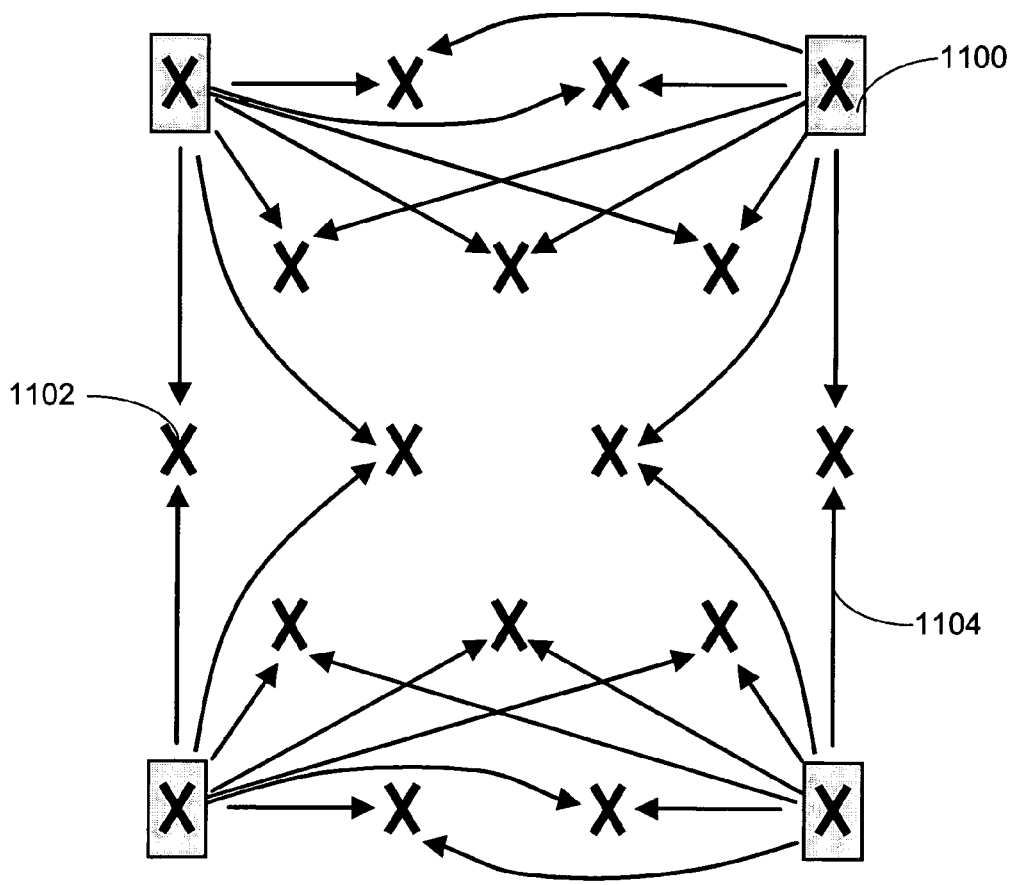
FIG. 11 is a diagram illustrating one embodiment of a keyframe placement configuration for a group of contemporaneously captured frames making up a "frame" of the interactive viewpoint video, which were captured in a regular triangular viewpoint grid, and where multi-directional spatial prediction is employed.

A similar keyframe placement pattern is shown in FIG. 11 for a group of contemporaneously captured frames making up a "frame" of the interactive viewpoint video, which were captured in a regular triangular viewpoint grid configuration. Here again, each non-keyframe 1102 will be predicted by two separate keyframes 1100 as indicated by the lines 1104.

In essence, the difference between the previously described spatial prediction scheme and multi-directional spatial prediction is that prior to computing the difference image, a combined predictor image is generated on a block-by-block basis. This combined predictor image is then used in place of the keyframe to compute the difference image and encode the non-keyframe image being compressed. The combined predictor image is generated for each corresponding block of the warped keyframes by averaging the YuvD values associated with each corresponding pixel location (if such values exist) to produce a block of averaged pixel values. If for any pixel location only one warped keyframe has an available YuvD value.(e.g., an occlusion hole), then the YuvD values of that warped keyframe is assigned to the location. If none of the warped keyframes have pixel data for the pixel location, then the combined predictor image is assigned no data for that pixel location.

Figure 12A:
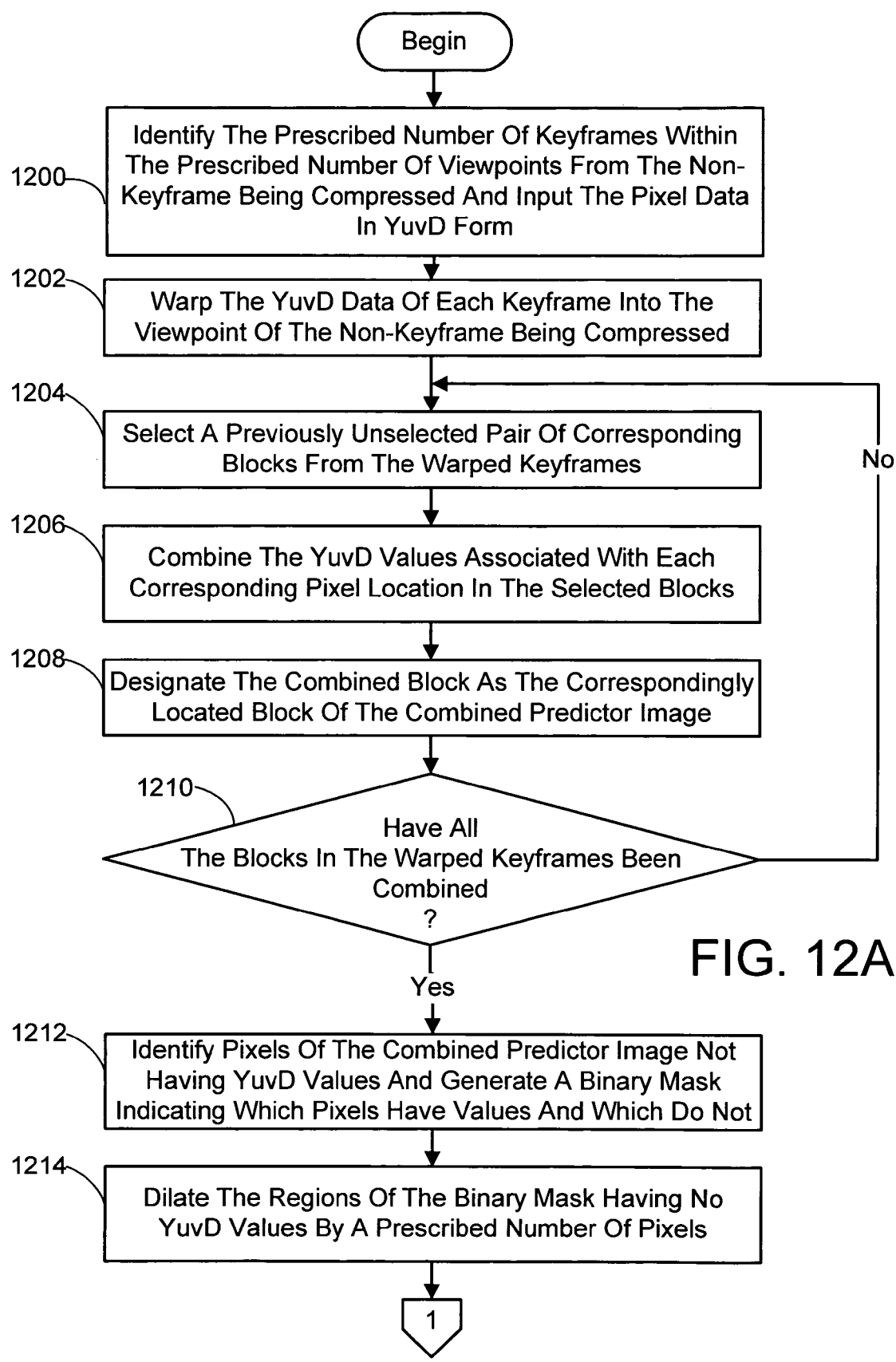
FIGS. 12A-C diagram a process for compressing non-keyframe images using a multi-directional predictive spatial compression technique according to the present invention.
Figure 12B:
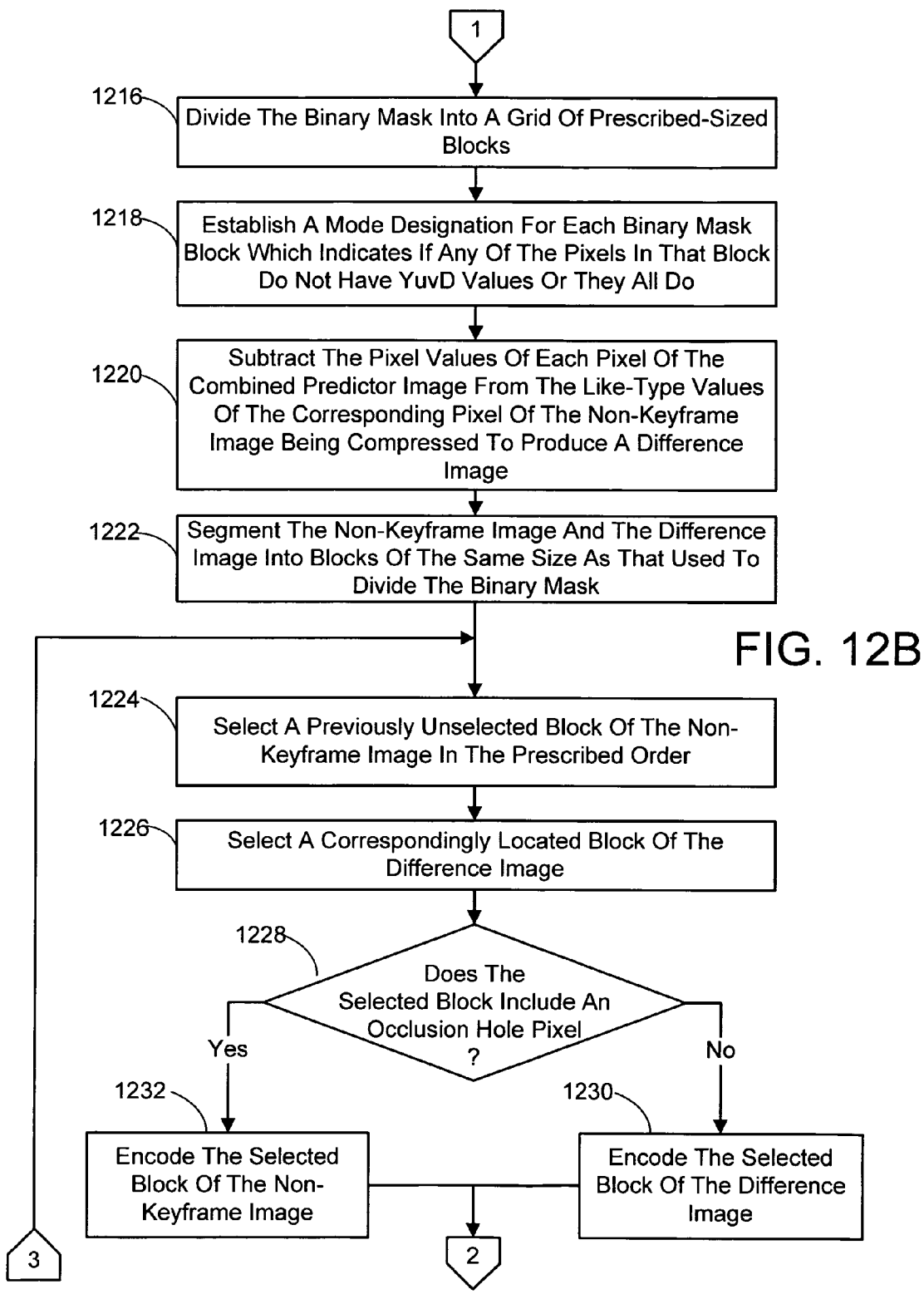
Figure 12C:
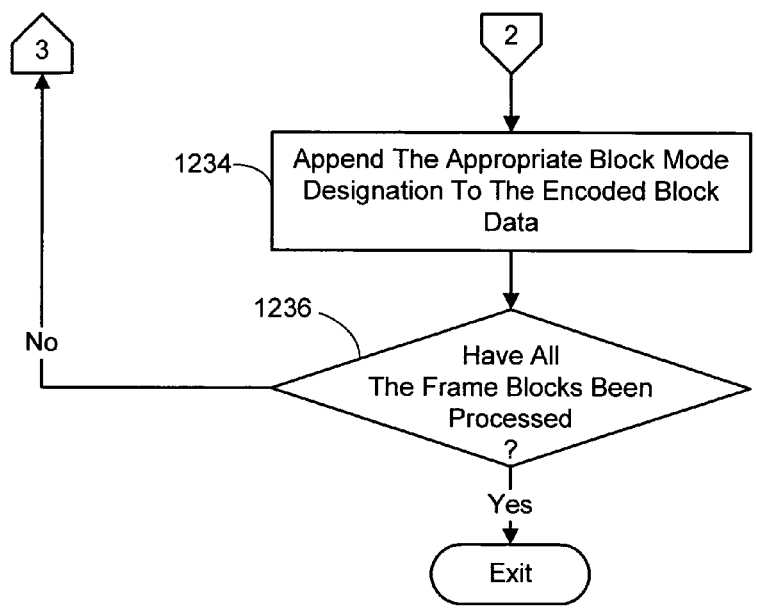

More particularly, the spatial compression procedure described above can be modified as follows to implement the multi-directional prediction scheme for each non-keyframe image in each of the aforementioned sets of contemporaneous frames. Referring to FIGS. 12A-C, a prescribed number of keyframes (e.g., two) within a prescribed number of viewpoints from the non-keyframe being compressed are identified, and their YuvD pixel data is input (process action 1200). The disparity data (D) of the identified keyframes, and the camera parameters of the cameras used to capture the keyframes and the non-keyframe being compressed, are then used to warp both the texture and disparity data (YuvD) into the viewpoint of the non-keyframe image (process action 1202). A pair of previously unselected corresponding blocks are then selected from the warped keyframes (process action 1204) and the YuvD values associated with each corresponding pixel location in the selected blocks are combined by appropriately averaging and taking the union of YuvD data so as to fill in occlusion holes as described above (process action 1206). The resulting combined block is designated as the correspondingly-located block of the aforementioned combined predictor image (process action 1208). It is next determined if there are any remaining blocks in the warped keyframes that have not been combined (process action 1210). If so, then process actions 1204 through 1210 are repeated until all the blocks have been processed. It is noted that the block size can be any desired, but 16×16 pixel blocks were used in tested embodiments.

The process then continues in the same manner as described in connection with the non multi-directional spatial prediction scheme except that the combined predictor image is used instead of a single warped keyframe. More particularly, the pixels of the combined predictor image not having YuvD values are identified and a binary mask is generated (process action 1212), which for each pixel location has one binary value (e.g., 1) if YuvD pixel values are available and the other binary value (e.g., 0) if no YuvD values exist. The regions of the binary mask indicating there are no YuvD values available are then dilated by a prescribed number of pixels (e.g., 1) in process action 1214. Next, the binary mask is divided into a grid of prescribed-sized blocks (process action 1216). In tested embodiments, 16×16 pixel blocks are employed. A mode designation is then established for each block, which indicates if any of the binary mask "pixels" in that block have the second binary value associated with an occlusion hole (process action 1218). In tested embodiments, a first binary value (e.g., 1) is used to indicate that a block had occlusion hole pixels in it and the second binary value (e.g., 0) was used to indicate there were no hole pixels.

Meanwhile, the pixel values of each pixel of the combined predictor image are subtracted from the like-type values of the corresponding pixel of the non-keyframe image being compressed, to produce a difference image (process action 1220). The non-keyframe image and the difference image are then segmented in blocks of the same size as that used to divide up the binary mask (process action 1222), and in a prescribed order (e.g., raster order in tested embodiments) each block is each image is compressed. More particularly, a previously unselected block of the non-keyframe image is selected in the prescribed order (process action 1224). In addition, a correspondingly located block of the difference image is selected (process action 1226). It is then determined if the selected block is designated as including an occlusion hole pixel, or not, using the previously established designation mode for the block (process action 1228). The selected block of the difference image is encoded using the previously described modified version of the I-frame compression technique, if it is found that the block is designated as not including any occlusion hole pixels (process action 1230). However, if it is found that the block is designated as including occlusion hole pixels, the selected block of the non-keyframe image is encoded using the previously-described alternate modified version of the I-frame compression technique (process action 1232).

Regardless of whether the compressed block is produced from a direct block or a difference image block, in process action 1234, the appropriate block mode designation is appended to the compressed block data. It is then determined if all the blocks of the non-keyframe image being compressed have been processed (process action 1236). If not, then process actions 1224 through 1236 are repeated until all the blocks are encoded, at which time the compression process ends for the non-keyframe under consideration.

It is noted that the identities of the keyframes used to create the combined predictor image are included in the compressed data associated with the non-keyframe being compressed. As will be described shortly, this information is employed in the decompression process. It is further noted that while the foregoing multi-directional spatial prediction technique is described in the context of compressing the main layer of non-keyframe images, it is equally applicable to a system where the entire non-keyframe image is compressed, not just the main layer.

1.2.1.3.2 Chain-Based Spatial Prediction

In both the single and multi-directional spatial prediction schemes described so far, a keyframe is employed as the reference used to encode a non-keyframe image. While a non-keyframe image being encoded may be directly adjacent a keyframe in the grid, many will not be, assuming that the aforementioned prescribed number of viewpoints a non-keyframe can be away from a keyframe being used as its reference is greater than one. A problem arises in that the further the viewpoint of a non-keyframe image is from that of the keyframe being used as a reference, the more dissimilar the images will be. The higher degree of dissimilarity results in more difference data having to be encoded, and so a lower compression rate. One solution would be to increase the number of keyframes so that the non-keyframe image is always close to a keyframe. However, the previously-described compression scheme used for keyframes requires more data to be encoded than the spatial prediction scheme requires. Thus, increasing the number of keyframes would result in a reduction in the overall compression rate. Another way of approaching the problem is to employ a chaining technique. Essentially, chaining involves using adjacent images in the grid as a reference for encoding a non-keyframe image, even if that adjacent image is not a keyframe. This allows both the number of keyframes and the amount of difference data required in spatial prediction to be minimized. The drawback comes in the decoding phase where it will be necessary to decode the keyframe first as before, but in addition, starting with an adjacent non-keyframe image encoded using the keyframe, decoding each non-keyframe in turn along the chain of non-keyframes until the non-keyframe used as a reference to encode the image of interest is decoded. That last decoded non-keyframe image is then used to decode the image of interest. Thus, while the compression rate is maximized, the decoding speed is decreased. However, this may be acceptable in some applications.

Figure 13:
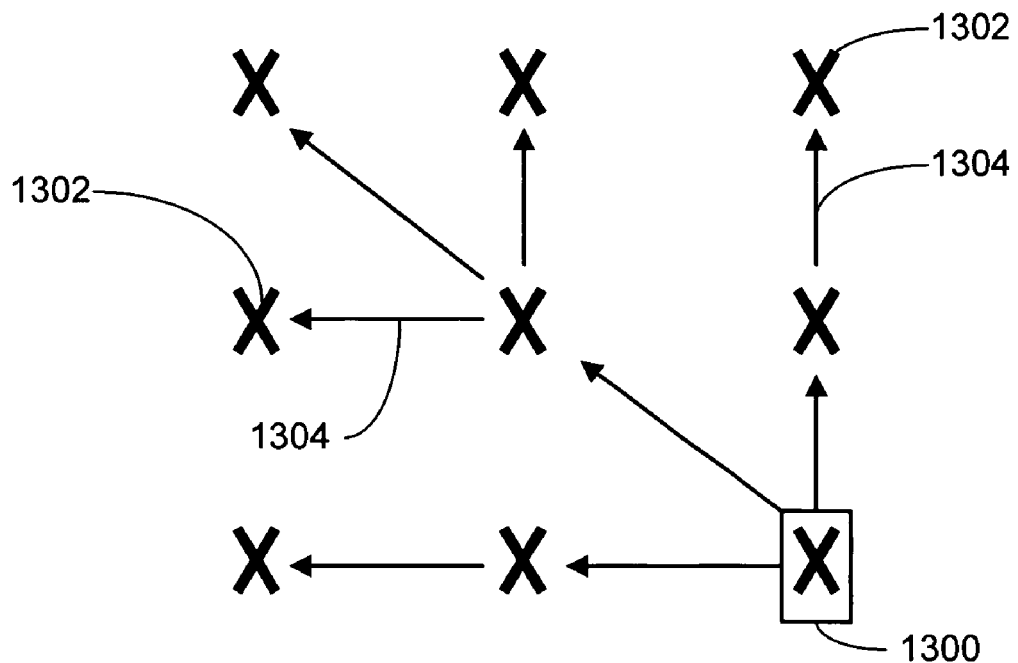
FIG. 13 is a diagram illustrating one embodiment of a chain-based spatial prediction technique according to the present invention for a group of contemporaneously captured frames making up a "frame" of the interactive viewpoint video, which were captured in a regular 3×3 rectangular viewpoint grid.
Figure 14:
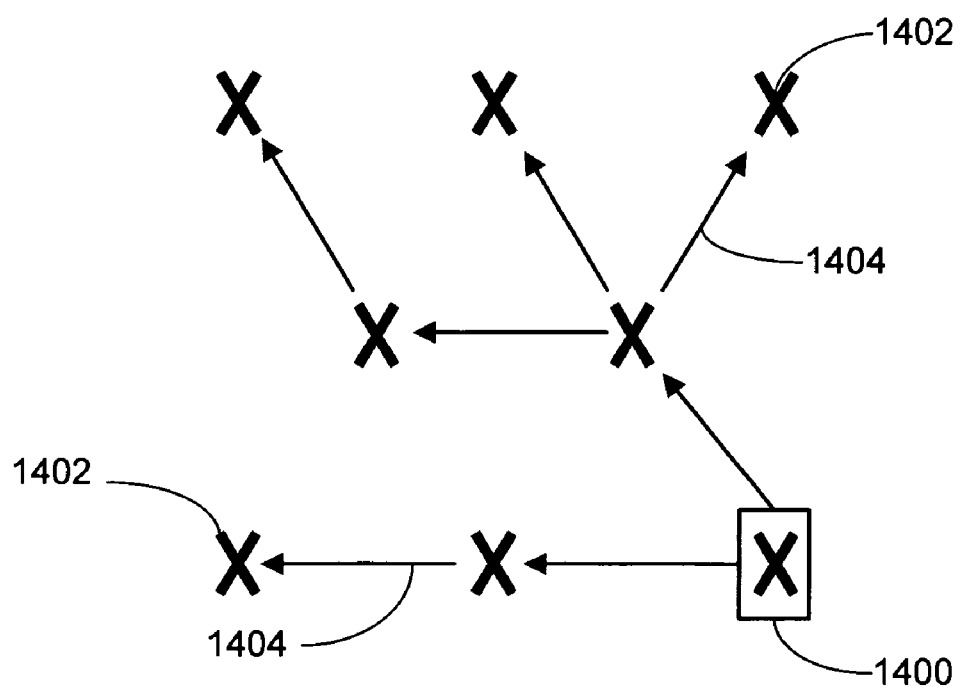
FIG. 14 is a diagram illustrating one embodiment of a chain-based spatial prediction technique according to the present invention for group of contemporaneously captured frames making up a "frame" of the interactive viewpoint video, which were captured in a regular triangular viewpoint grid.
Figure 15:
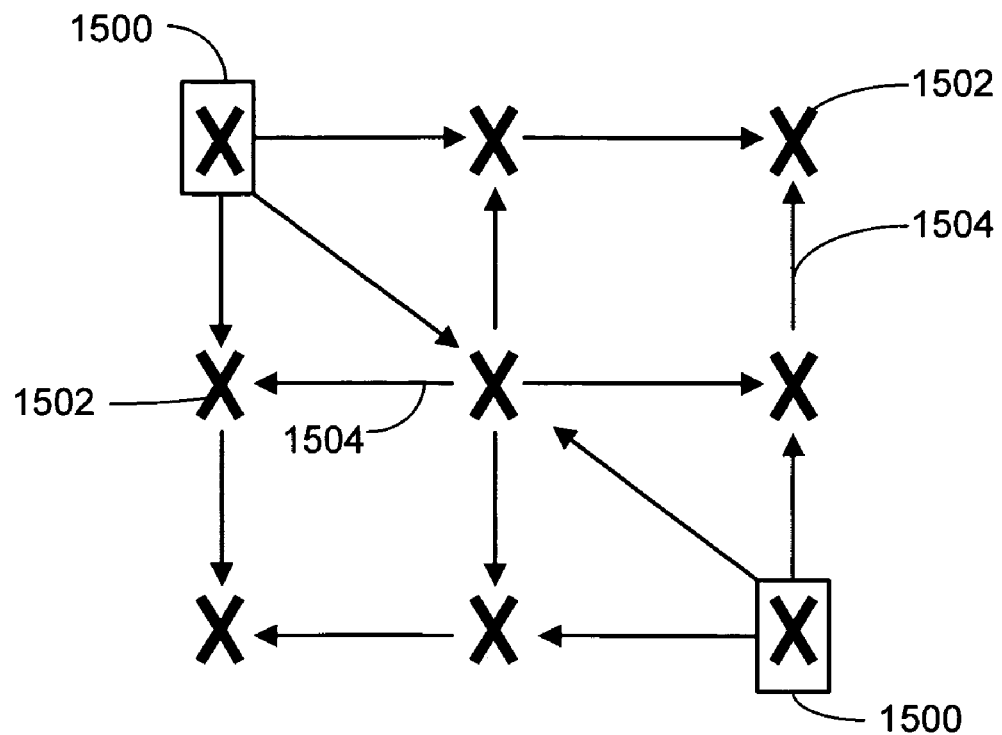
FIG. 15 is a diagram illustrating one embodiment of chain-based, multi-directional spatial prediction technique according to the present invention for a group of contemporaneously captured frames making up a "frame" of the interactive viewpoint video, which were captured in a regular 3×3 rectangular viewpoint grid.
Figure 16:
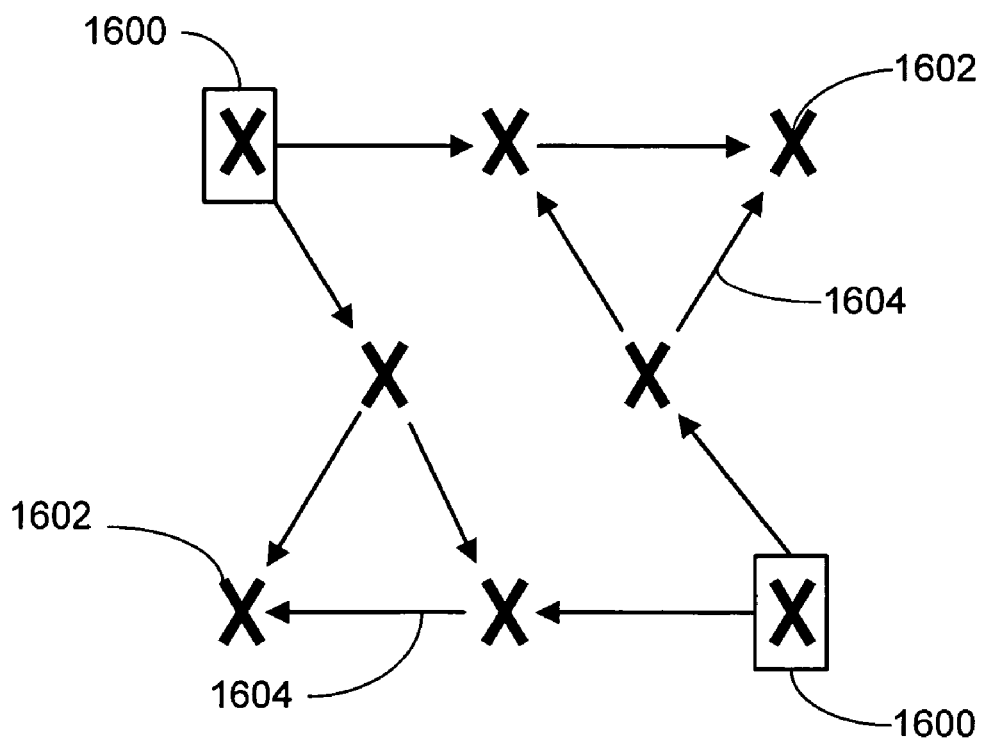
FIG. 16 is a diagram illustrating one embodiment of a chain-based, multi-directional spatial prediction technique according to the present invention for group of contemporaneously captured frames making up a "frame" of the interactive viewpoint video, which were captured in a regular triangular viewpoint grid.

The foregoing chain-based spatial prediction technique can be employed in both the single and multi-directional spatial prediction schemes. FIG. 13 illustrates a group of contemporaneously captured frames making up a "frame" of the interactive viewpoint video, which were captured in a regular rectangular viewpoint grid configuration and which are being encoded using the single spatial prediction scheme. In this example, the boxed X identifies the keyframe 1300 and the chain of images used in encoding each non-keyframe image (i.e., the non-boxed X's 1302) is shown by the lines 1304. Similarly, FIG. 14 shows a group of contemporaneously captured frames making up a "frame" of the interactive viewpoint video, which were captured in a regular triangular viewpoint grid configuration and which are being encoded using the single spatial prediction scheme. In this example, the boxed X identifies the keyframe 1400 and the chain of images used in encoding each non-keyframe image (i.e., the non-boxed X's 1402) is shown by the lines 1404. FIG. 15 illustrates a group of contemporaneously captured frames making up a "frame" of the interactive viewpoint video, which were captured in a regular rectangular viewpoint grid configuration and which are being encoded multi-directionally. In this example, the boxed X's identify the keyframes 1500 and the chain of images used in encoding each non-keyframe image (i.e., the non-boxed X's 1502) is shown by the lines 1504. Similarly, FIG. 16 shows a group of contemporaneously captured frames making up a "frame" of the interactive viewpoint video, which were captured in a regular triangular viewpoint grid configuration. In this example, the boxed X's identify the keyframes 1600 and the chain of images used in encoding each non-keyframe image (i.e., the non-boxed X's 1602) is shown by the lines 1604. Note that in the latter two examples, most of the non-keyframes will be predicted by two separate images. It is also noted that FIGS. 13-16 represent examples only. Other keyframe arrangements and encoding patterns are envisioned and within the scope of the present invention.

It is apparent from the foregoing description that there can be many possible chains which can be created to encode each non-keyframe image. Given that the sequence and length of candidate chains which can be used to encode a non-keyframe image may vary greatly, a question arises as to how to select the chain or chains. In deciding which chain or chains to employ in the encoding process, a key consideration is the efficiency of the chain. In other words, it is advantageous to select the chain or chains that will produce the least amount of difference data, and so ultimately the highest compression rate.

In one embodiment of the present invention, the method for choosing the most efficient chain or chains involves identifying a list of candidates and using each to encode the non-keyframe under consideration. The chain or chains producing the least amount of difference data would be selected. While this method would produce superior results, it is expensive in terms of processing resources and time. A short cut method that could be employed instead involves simply subtracting the images in the chain and computing an overall difference value. For example, starting with the first non-keyframe image in the chain, each image is subtracted from the preceding image to produce a difference value. The sum of all the differences in the chain represents the overall difference value. The lower the overall difference value, the more efficient the chain is estimated to be. One way of subtracting the images is to sum the absolute values of the differences between the pixel values of each corresponding pixel location in the images, after warping the preceding frame in the chain into the viewpoint of the subsequent frame of the pair.

While the foregoing methods provide a good indication of the most efficient chain or chains, even the short-cut difference technique may expend more processing resources and time than is desired. For example, where the image data is being compressed in a real time system, processing time is at a premium. In such cases a static or rule-based decision process can be employed to choose the chain or chains that will be used to encode a non-keyframe image. For example, a "closest to" rule could be implemented. Under this rule, an adjacent image in the grid having the viewpoint closest to the non-keyframe being encoded is selected as the first link in the chain. Then, if the selected image is not a keyframe, an adjacent image in the grid having the viewpoint closest to the selected image is chosen as the next link in the chain. This process is repeated until the last selected image is a keyframe. It is noted that if two or more images are equally as close to a non-keyframe under consideration, then one is chosen arbitrarily. If more than one image is to be used as a reference to encode a non-keyframe image (such as in the multi-directional spatial prediction technique), then the foregoing chain building process is repeated by selecting the closest adjacent image in the grid to the non-keyframe being encoded which has not been selected before as the first link in the chain.

When multi-directional spatial prediction is combined with a chain-based technique, there may be situations where it is advantageous to encode one or more of the non-keyframe images along a chain with less than the maximum desired reference images. For example, in the case of a 1D in-line set of cameras with two keyframes at each end, it might be desirable to code those directly adjacent to the keyframe cameras using only the single appropriate adjacent keyframes as references but to code the intermediate camera images using both keyframe references. Thus, the non-keyframe images in the overall grid of images can be encoded in different ways involving the use of one, two, or even more reference images, depending on the method used to choose a chain in those cases where two or more chains are used.

Regardless of whether the chain-based spatial prediction technique involves a single chain, two chains, or more, when encoding a non-keyframe image, the encoding technique is nearly identical to that described previously for the like situation without chaining. Thus, for each non-keyframe image in a chain being encoded with a single reference image, the previously-described process for encoding a non-keyframe image using a single keyframe would apply, with the exception that the reference image may not be a keyframe and that the identity of all the images in the chain and their sequence order would be included in the encoded data for each non-keyframe image. Likewise, the previously-described process for encoding a non-keyframe image using a multi-directional spatial prediction technique would apply—again with the exception that one or more of the reference images may not be keyframes and that the identity of all the images in both chains and their sequence order would be included in the encoded data for each non-keyframe image.

1.2.1.3.3 Multi-Directional and Chain-Based Spatial Prediction for In-Line Camera Embodiments The foregoing multi-directional and chain-based spatial prediction techniques also apply to a configuration where each set of contemporaneous frames of the multiple video streams is captured using a row of cameras, rather than a grid. Such a configuration is the subject of a co-pending application entitled "Interactive Viewpoint Video System And Process", which was filed on Jun. 28, 2004 and assigned Ser. No. 10/880,774. The co-pending application describes an interactive viewpoint video capture system which includes a bank of video cameras, arranged in a side-by-side manner (also referred to as an in-line configuration or row). In addition, the cameras have a convergent configuration such that each points generally toward the same target object or area in a scene with each camera's field of view overlapping the field of view of the adjacent camera or cameras by a prescribed amount. The orientation of the cameras in relation to the target object or area can vary depending on the desired results. In other words, the distance each camera is away from the target object or area and its height and/or horizontal placement in relation to the target can vary. For example, the row of cameras could form an arc. In general, any viewing path can be created by lining the cameras up along that desired path.

Figure 17:
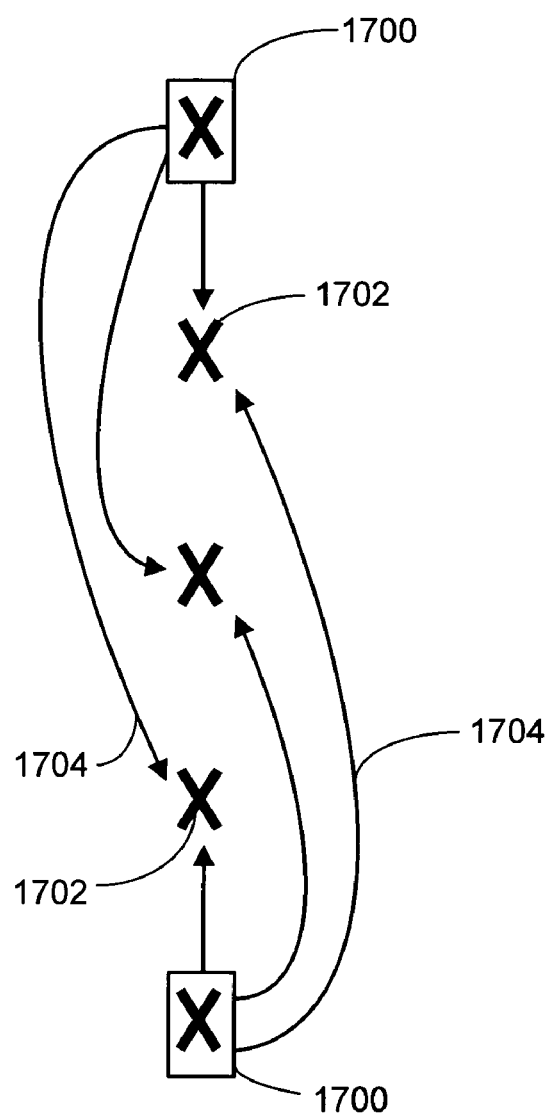
FIG. 17 is a diagram illustrating one embodiment of a multi-directional spatial prediction technique according to the present invention for a group of contemporaneously captured frames making up a "frame" of the interactive viewpoint video, which were captured in a vertical row pattern.

The previously-described procedures for compressing non-keyframe images in each set of contemporaneous frames is essentially the same when dealing with a row of viewpoints, rather than a grid. For example, in regard to multi-directional spatial prediction FIG. 17 illustrates the possible keyframe placement for a group of contemporaneously captured frames making up a "frame" of the interactive viewpoint video, which were captured in a vertical row. In this example, the boxed X's identify the viewpoints that are designated as keyframes 1700 and the prescribed number of viewpoints that a non-keyframe 1702 can be from a keyframe for prediction purposes is three. The lines 1704 indicate which keyframes 1700 are used to predict which non-keyframes 1702. Note that each non-keyframe 1702 will be predicted by two separate keyframes 1700 in this example. The compression and decompression processes are the same as employed when compressing and decompressing a non-keyframe in a grid of viewpoints that used multiple keyframes as reference images.

Figure 18:
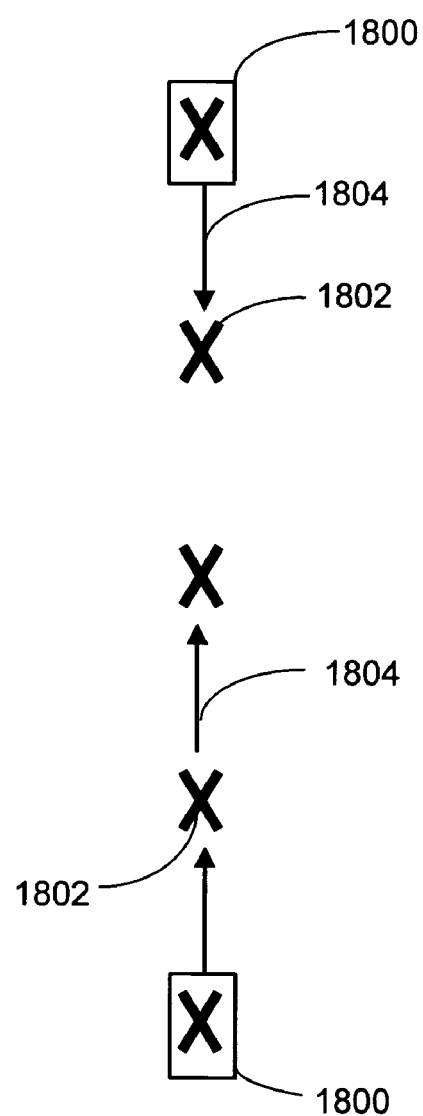
FIG. 18 is a diagram illustrating one embodiment of a chain-based spatial prediction technique according to the present invention for a group of contemporaneously captured frames making up a "frame" of the interactive viewpoint video, which were captured in a vertical row pattern.
Figure 19:
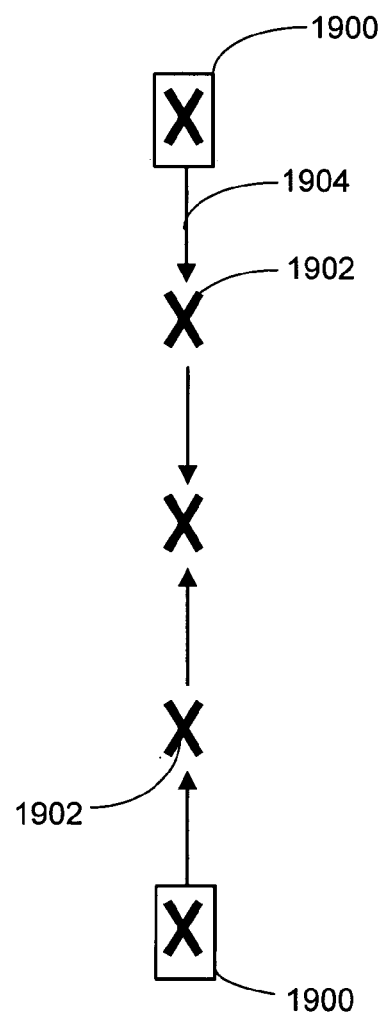
FIG. 19 is a diagram illustrating one embodiment of a chain-based, multi-directional spatial prediction technique according to the present invention for a group of contemporaneously captured frames making up a "frame" of the interactive viewpoint video, which were captured in a vertical row pattern.

With regard to chain-based spatial prediction, FIG. 18, illustrates a group of contemporaneously captured frames making up a "frame" of the interactive viewpoint video, which were captured in a vertical row and which are being encoded using a combined chaining and single spatial prediction scheme. In this example, the boxed X's identify the keyframes 1800 and the chain of images used in encoding each non-keyframe image (i.e., the non-boxed X's 1802) is shown by the lines 1804. Similarly, FIG. 19 illustrates a group of contemporaneously captured frames which are being encoded using a combined chaining and multi-directional spatial prediction scheme. In this example, the boxed X's identify the keyframes 1900 and the chain of images used in encoding each non-keyframe image (i.e., the non-boxed X's 1902) is shown by the lines 1904. The processes used to compress and decompress the non-keyframes in either of the depicted scenarios are the same ones employed when compressing the non-keyframes in a grid of viewpoints that used a combined chaining and spatial prediction technique.

1.2.1.4 Compression of Boundary Layer Data

As described previously, each component frame in each set of contemporaneously captured frames making up a "frame" of the interactive viewpoint video data is also represented by a boundary layer comprising pixels having assigned RGBAD values. These boundary layers are compressed using a non-predictive I-frame technique similar to that described above in connection with the compression of main layer keyframes, except sub-blocks associated with the A plane are added to the process and only those blocks with non-transparent pixels are encoded. This compression technique as it applies to the boundary layer data associated with a component frame will now be described in more detail.

Figure 6A:
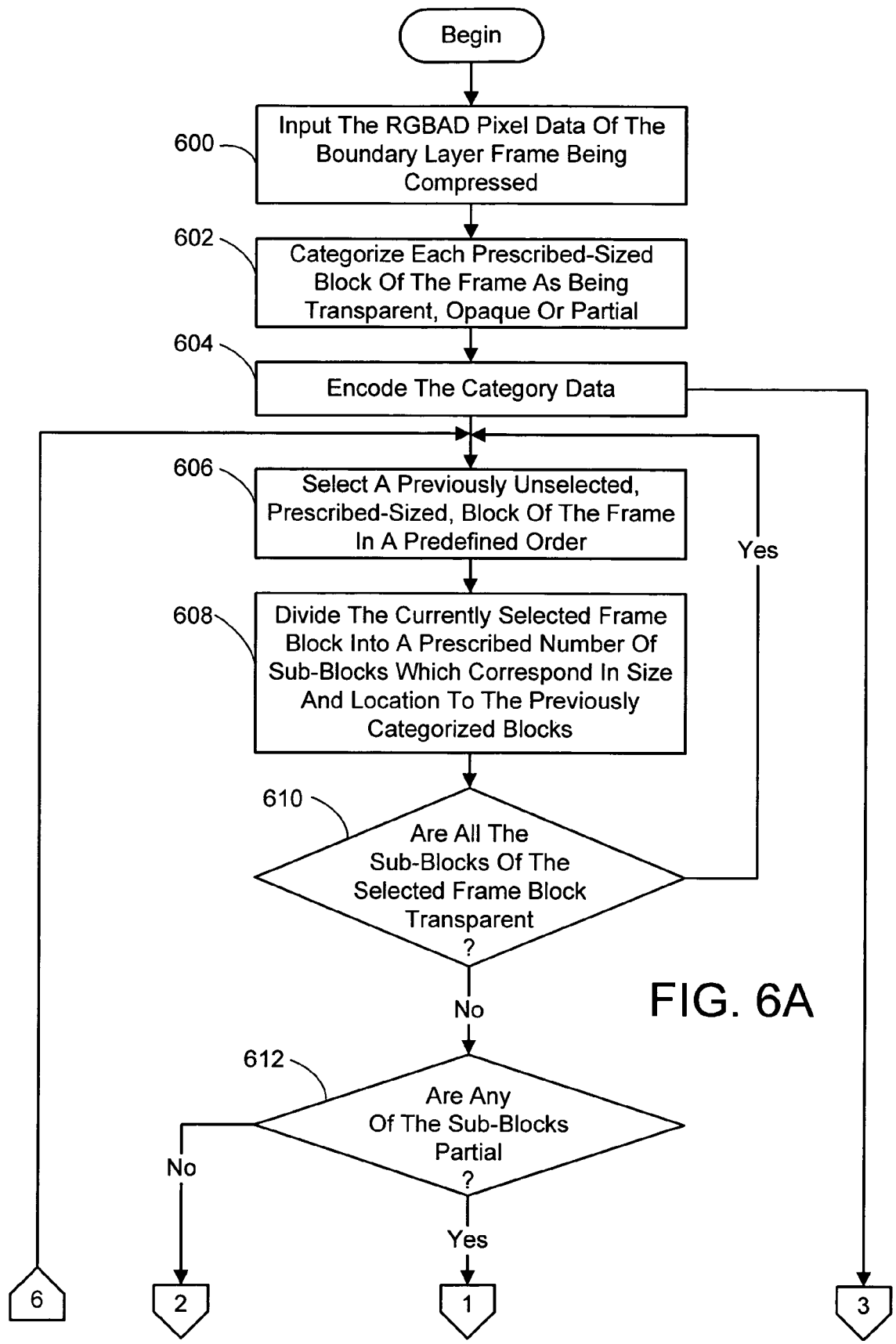
FIGS. 6A-C are a flow chart diagramming a process for compressing boundary layer data using a non-predictive I-frame compression technique.
Figure 6B:
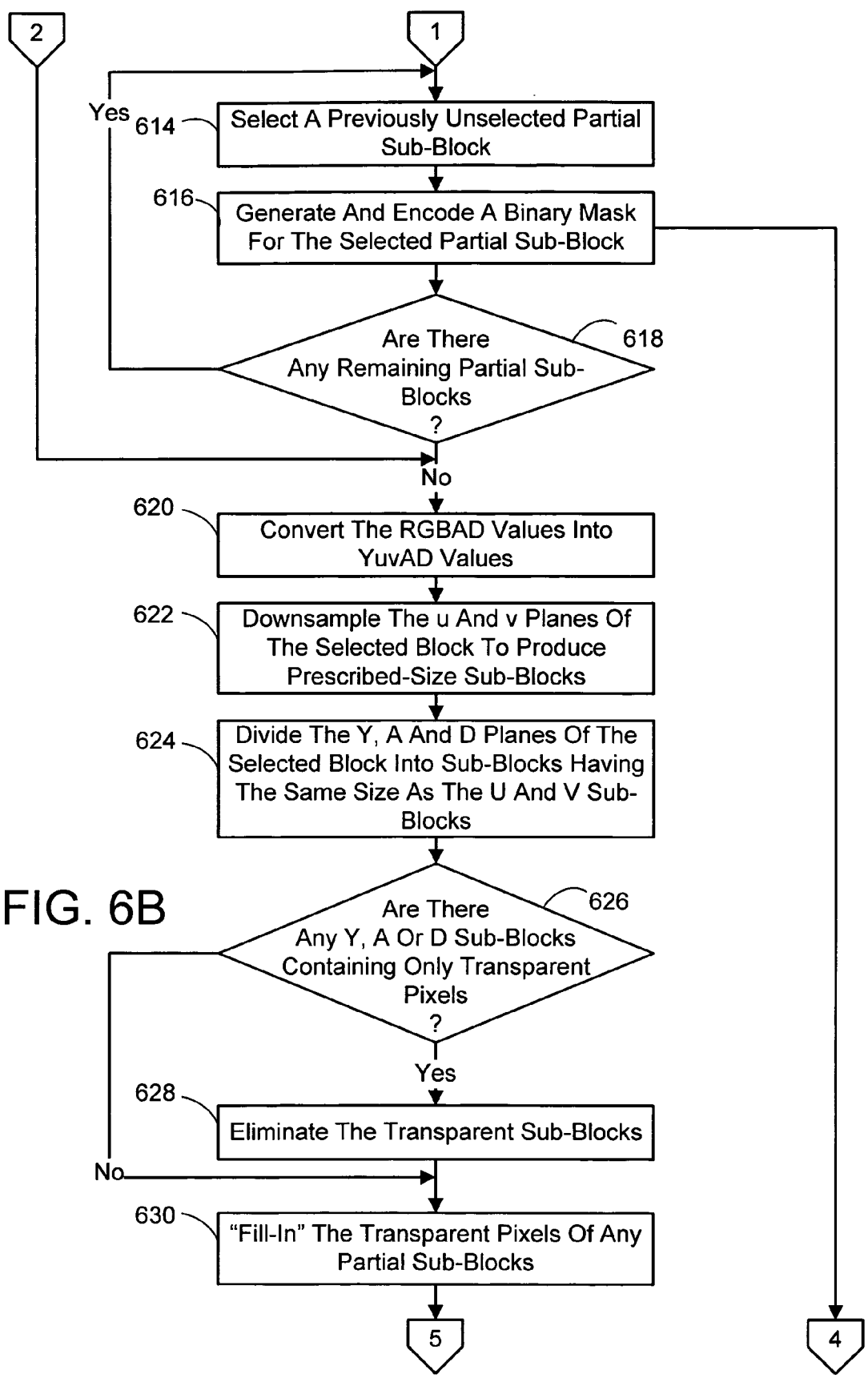
Figure 6C:
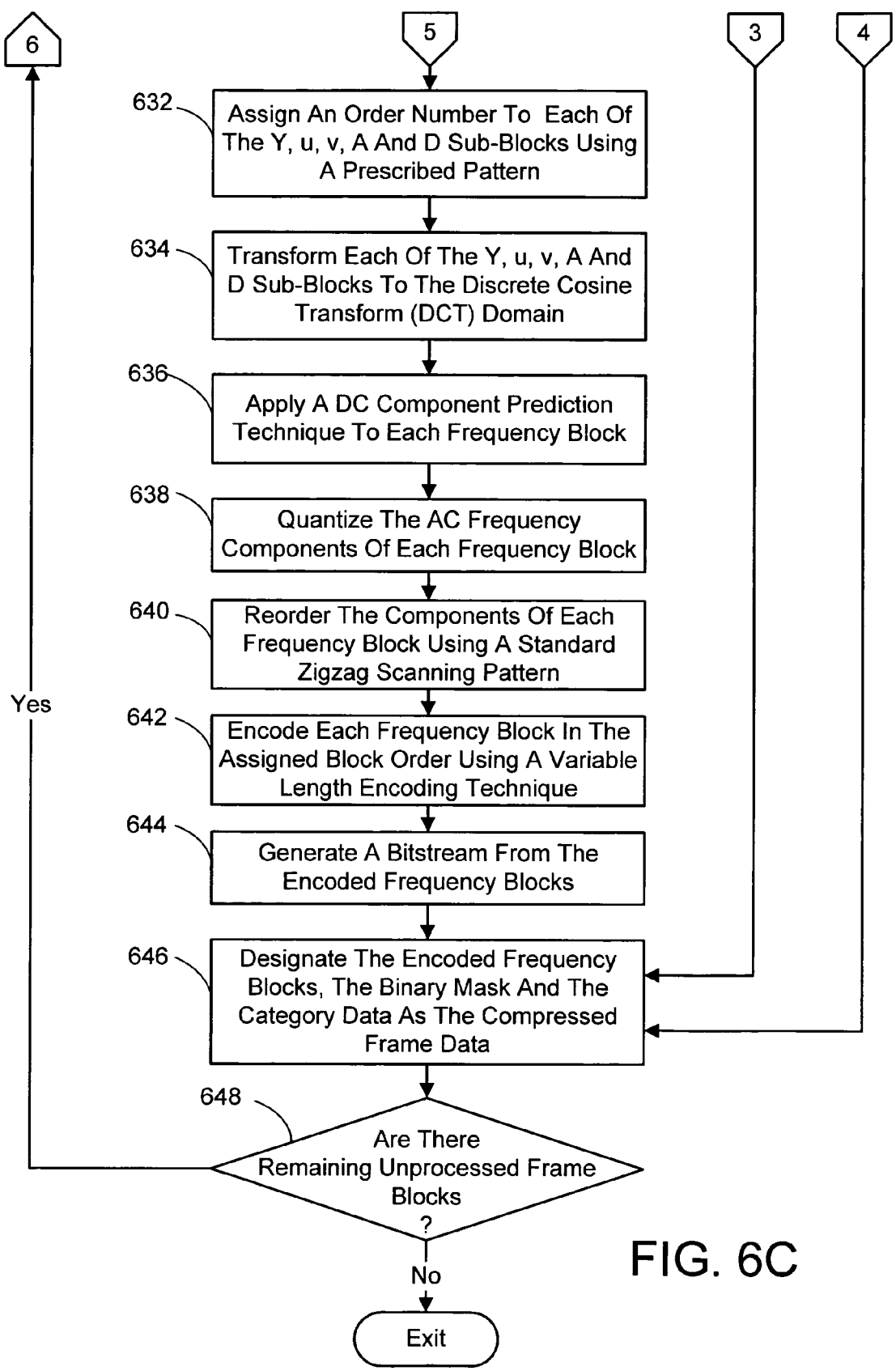

Referring to FIGS. 6A-C, the boundary layer compression process begins with a procedure to encode data specifying which prescribed-size blocks contain pixels that are all transparent (T), all opaque (O), or are partially transparent and partially opaque (hereinafter referred to a partial blocks (P)). To this end, in process action 600, the RGBAD pixel data of the boundary layer frame being compressed is input. Then, each prescribed-sized block of the image (e.g., 8×8 in tested embodiments) is categorized as being transparent, opaque or partial based on the A values by comparing each pixel against a fixed threshold value (process action 602). This category data is then encoded (process action 604). In tested embodiments, this encoding involves the use of quadtree & Huffman variable length coding techniques.

In regard to the quadtree procedure, this entails starting with the whole frame at a root level, and then:

(a) Generating a code indicating the category (which in the case of the root level is going to be a partial block). In tested embodiments, blocks categorized as being partial are represented by the smallest code number used (e.g., 0);

(b) If the last code generated is for a partial block, then the frame is divided into four quadrant sub-blocks;

(c) These sub-blocks are then sequentially selected in raster order, and for each a code is generated indicating its category (i.e., T, O or P);

(d) If a sub-block is found to be a partial block, before moving on to the next sub-block, steps (b) through (d) are repeated for the sub-block under consideration (rather than the frame as a whole), unless the sub-block is of a prescribed minimum size (i.e., 8×8 in tested embodiments).

The encoded quadtree data becomes part of the compressed boundary layer frame along with image data and other data that will be described next. However, it is noted that the categorizations of the aforementioned blocks are needed to generate this other data and so are retained for that purpose.

Once the block categorization data is encoded, the compression process continues with the selection of a previously unselected, prescribed-sized, block of the frame in a predefined order (process action 606). In tested embodiments, 16×16 pixel blocks were employed and selected in raster order. The currently selected frame block is divided into a prescribed number of sub-blocks which correspond to the size and location of the previously categorized blocks (process action 608). In tested embodiments, the frame blocks are divided into four 8×8 pixel quadrant sub-blocks.

Next, it is determined if all the sub-blocks of the selected frame block are categorized as being transparent (process action 610). If so, no code is generated, and process actions 606 through 610 are repeated for the next frame block. If any of the sub-blocks are not transparent, then it is determined if any of the sub-blocks are categorized as being partial blocks (process action 612). If so, then a previously unselected one of them is selected (process action 614). A binary mask is then generated for the selected partial sub-block and encoded (process action 616). This binary mask is generated by first performing the previously described quadtree procedure, except this time going down to a smaller prescribed sub-block level. In tested embodiments, this lowest prescribed level is a 2×2 pixel sub-block. However, rather than coding a lowest level sub-block as being partial, such a block is instead coded to indicate which pixels are opaque and which are transparent. Thus, one binary value is used to indicate an opaque pixel and the other binary value is used to indicate a transparent pixel. In tested embodiments, the aforementioned lowest level partial sub-block coding is a 4-bit code generated using a raster order. The resulting quadtree data is then encoded using an appropriate compression procedure, such as the Huffmann variable length encoding technique used in tested embodiments of the present invention. The encoded binary mask data for the selected partial sub-block also becomes part of the compressed frame as indicated in FIG. 6C.

It is then determined if there are any remaining partial sub-blocks in the selected frame block that have not yet been selected (process action 618). If so, process actions 614 through 618 are repeated for each of the remaining partial sub-blocks. If not, then the compression process continues as follows.

The selected frame block is encoded next. Essentially, this is done in the same way as previously described in connection with the encoding of the main layer I-frames, except that the A plane data is added and only non-transparent sub-blocks are encoded. Thus, the RGB values of the selected frame block are converted to Yuv values (process action 620), and the u and v planes are downsampled to produce u and v sub-blocks (process action 622). Further, the Y, D and now A planes are divided into sub-blocks that are the same size as the u and v sub-blocks (process action 624). At this point, it is determined if any of the Y, A or D sub-blocks contain only transparent pixels (process action 626). Preferably, the sub-block size is the same as that used to categorize the frame so that this categorization data can be used directly to make the foregoing determination. Any transparent sub-block is eliminated from consideration in process action 628. It is noted that since the frame block being considered will contain at least one opaque or partial sub-block, and since the u and v sub-blocks are downsampled versions of the frame block, they are automatically considered as being non-transparent sub-blocks.

To facilitate the encoding procedure to be described shortly, the transparent pixels of the partial sub-blocks for Y, u, v, A, or D are "filled-in" (process action 630). This can be done by, for example, using the MPEG4 standard's repetitive padding technique or by filling in with an average value based on those pixels which are non-transparent. The remaining sub-blocks (including the u and v sub-blocks) are next ordered in a prescribed pattern (process action 632). In tested embodiments, the ordering involved assigning a sequential number (e.g., 1, 2, 3 . . . ) to each sub-block starting with the non-transparent Y sub-blocks in raster order, and followed by the u and v sub-blocks. The non-transparent A sub-blocks are assigned order numbers next, followed by the non-transparent D sub-blocks, each in raster order.

The encoding then proceeds as described in connection with the encoding of the main layer keyframes. Namely, the ordered sub-blocks undergo DCT (process action 634), DC component prediction and differencing (process action 636), quantization (process action 638), component reordering (process action 640), coding (process action 642) and bitstream generation (process action 644). However, the procedure is modified in that the non-transparent A sub-block data is included in the processing and the CBP header is expanded to include a CBPA section that is coded in the same manner as the CBPY and CBPD sections. In addition, the CBPY, CBPA and CBPD sections indicate if a sub-block that would have been found in the data was eliminated because it was transparent. It is noted that since some of the neighboring sub-blocks needed in the DC prediction action may be eliminated transparent sub-blocks, a midrange DC component value appropriate for the application is substituted for the DC component of the missing sub-block.

The resulting encoded Y, u, v, A and D data then becomes part of the compressed boundary layer frame along with the encoded categorization data and the binary mask data, as shown in FIG. 6C, by the designation of this data as the compressed frame data (process action 646).

Next, it is determined if there are any remaining unselected frame blocks (process action 648). If so, process actions 606 through 648 are repeated for the remaining blocks, at which time the process ends.

1.2.2 Decompression

As indicated previously, the interactive viewpoint video allows a user to select a viewpoint from which he or she wishes to view the scene depicted in the current portion of the video. This user-selected viewpoint might coincide with one of the camera views, or more likely it will fall between camera views. Thus, only a limited amount of the data associated with the multiple, contemporaneously captured frames that make up each temporal frame set of the video will be needed to generate an image of the depicted scene from the selected viewpoint. This allows the video data to be selectively decoded and decompressed. Generally, just those portions of the incoming video data that are needed to render a current frame of the video from a vantage point selected by a user viewing the video, is decoded. In this way, the minimum amount of data possible must be handled, thereby speeding up the process and providing a quick rendering capability.

Once the needed video data is obtained, it is decoded. In general, the decompression processes associated with decoding the main layer and boundary layer data of a component frame encoded via the foregoing compression processes are just the reverse of these processes. However, some of the decompression processes do include unique actions. The decompression processes will now be described.

1.2.2.1 Decompression of Main Layer Keyframes

The decompression of encoded main layer keyframes that have been compressed using the previously described non-predictive I-frame technique is for the most part the reverse of the compression process with a few exceptions. This decompression process is generally accomplished by obtaining each portion of the datastream generated in the compression process that corresponds to a prescribed-sized block (e.g., 16×16 as in tested embodiments) of the frame being decoded, in the prescribed order in which they were encoded (e.g., raster order as in tested embodiments), and then decompressing each datastream portion.

Figure 7:
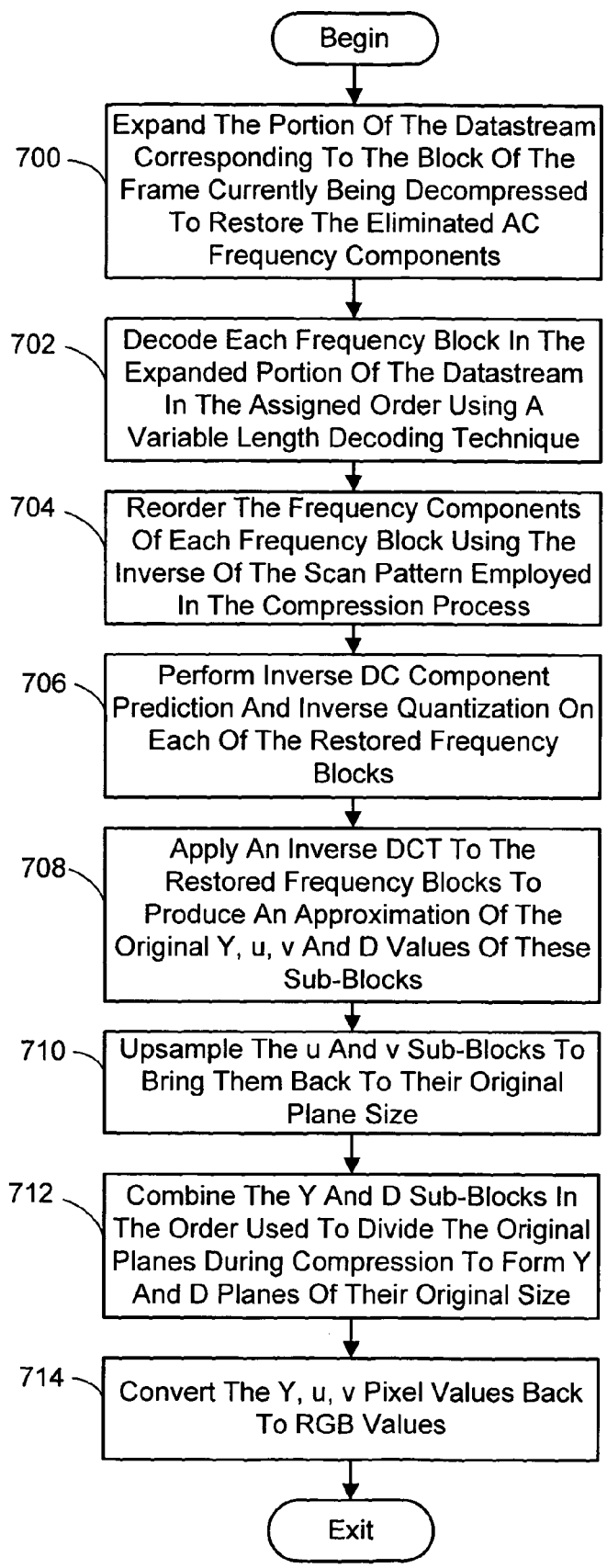
FIG. 7 is a flow chart diagramming a process for decompressing main layer keyframes using an I-frame decompression technique.

More particularly, referring to FIG. 7, for each portion of the datastream corresponding to an aforementioned block of the frame, the portion is expanded to restore the eliminated AC frequency components (process action 700). This entails adding zeros (e.g., up to 63 zeros in the case of an 8×8 frequency block) to the datastream in those places where the run-length Huffman codes or the CBP header indicates that zero-valued AC components have been deleted from the encoded frequency block data. The expanded datastream portion is then decoded using the particular decoding procedure associated with the way it was encoded (process action 702). For example, if the MPEG4 variable length Huffman encoding scheme was employed, the MPEG4 Huffman decoding procedure would be used to decode the datastream. Next, the inverse of the scan pattern employed in the compression process to reorder the frequency components of each frequency block (if any) is applied to restore the components to their original order (process action 704). For example, if a zigzag pattern was employed as in the tested embodiments of the present invention, an inverse zigzag scan pattern would be used to restore the original component order.

Inverse DC component prediction and quantization procedures are then performed on each of the restored frequency blocks (process action 706). In tested embodiments, this is accomplished using the inverse switched DC prediction technique and inverse quantization technique (in a similar manner to MPEG-4). The result of this action is to restore the original DC component to each frequency block. Next, an inverse of the DCT performed on the original Y, u, v and D sub-blocks is applied to the restored frequency blocks to produce an approximation of the original Y, u, v and D values of these sub-blocks (process action 708). The resulting u and v sub-blocks are upsampled to bring them back to their original plane size (e.g., 16×16 in tested embodiments) in process action 710. In addition, in process action 712, the Y and D sub-blocks are combined in the order used to divide the original planes during compression (e.g., raster order in tested embodiments) to form Y and D planes of their original size (e.g., 16×16 in tested embodiments).

Finally, the Y, u and v pixel values are converted back to RGB values using standard methods (process action 714) and the decompression process ends. The result is a restored block of pixels of the prescribed size (e.g., 16×16), each pixel of which has R, G, B, and D values assigned to it.

1.2.2.2 Decompression of Main Layer Keyframes Using P-Frames

The decompression of the main layer keyframes in each contemporaneous frame set compressed using the previously-described P-frame procedure, is accomplished using conventional inter-frame decompression techniques. In tested embodiments this involved the use of the P-frame recovery approach of the MPEG4 standard. The only modification to this approach was the recovery of the disparity values (D) since the main frame pixel data included this data. The D data is recovered in the same way as it was in the I-frame decompression procedure described previously in that it is handled just like the recovery of the Y data.

1.2.2.3 Decompression of Non-Keyframe Main Layers

Figure 8A:
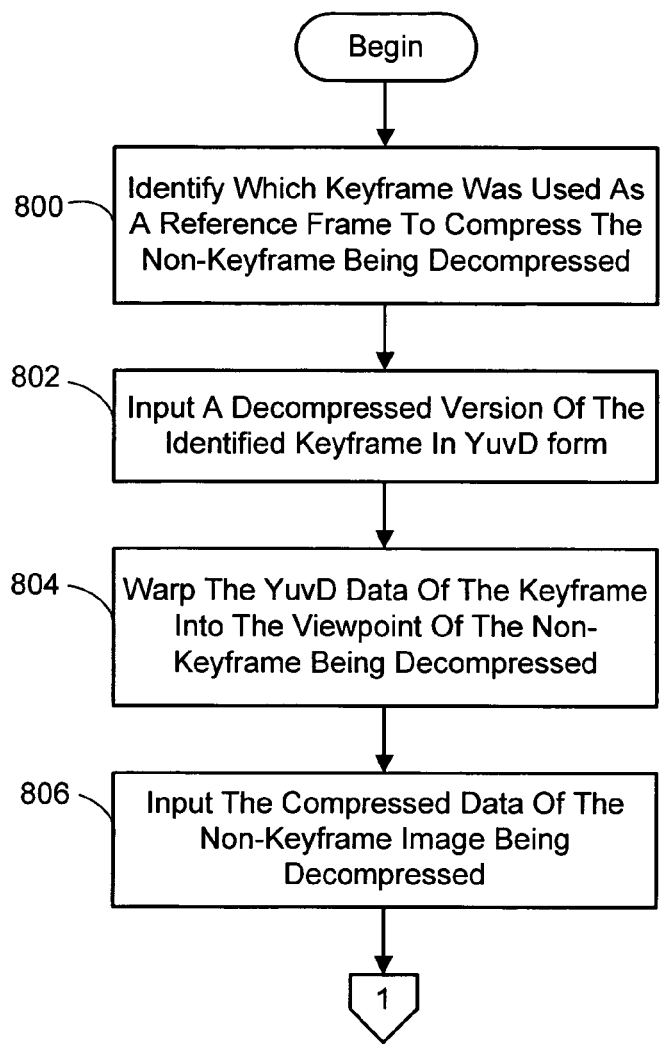
FIGS. 8A and 8B are a flow chart diagramming a process for decompressing main layer non-keyframe images using a spatial decompression technique.
Figure 8B:
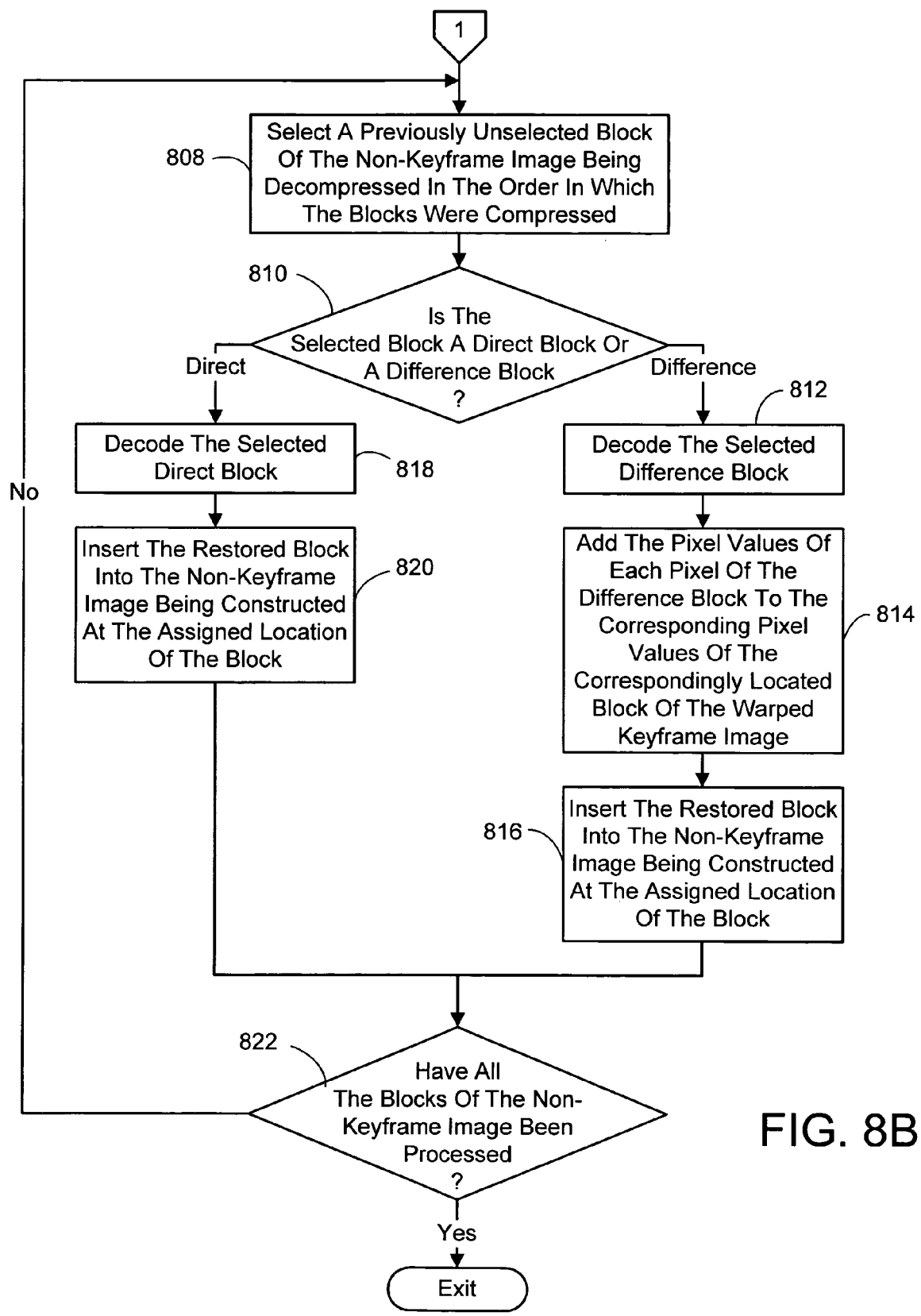

The decompression of the encoded main layer of non-keyframes that have been compressed using the previously-described spatial prediction compression technique will now be presented. As described previously, the non-keyframe images of each set of contemporaneous frames are decompressed using a decompressed keyframe of the set that was employed as a reference frame in compressing the non-keyframe image under consideration. In particular, referring to FIGS. 8A-B, for each non-keyframe in each set of contemporaneous frames, it is first determined which keyframe of the set (if there are more than one) was used as its reference frame (process action 800). A decompressed version of this keyframe is then input (process action 802) with its pixel data in YuvD form. The disparity data (D) of the keyframe, and the camera parameters (which are included in the compressed video data) of the cameras used to capture the keyframe and the non-keyframe being decompressed, are then used to transform both the texture and disparity data (YuvD) into the viewpoint of the non-keyframe being decompressed (process action 804). As with the compression of the non-keyframe images, the process used to "warp" the main layer of the keyframe to the viewpoint of the non-keyframe being decompressed is accomplished using conventional methods.

Meanwhile, the compressed non-keyframe image data associated with the non-keyframe being decompressed is input (process action 806). As discussed in connection with the compression of the non-keyframe data, a block mode designator for each prescribed-sized block of the image is included in the non-keyframe data. A previously unselected block of the non-keyframe being decompressed is then selected in a prescribed order matching the order the blocks were compressed (process action 808). A raster order was used in tested embodiments. It is next determined if the selected block is a direct block or a difference image block using the block mode designator included with in the block data (process action 810). If it is found that the selected block is a difference image block, it is decoded using a modified version of the I-frame decompression technique described previously in connection with the decompression of certain keyframes, (process action 812). These modifications involve skipping the inverse DC prediction step as the prediction procedure was not done in compressing the data. In addition, instead of using the standard decoding tables to decode the DC component (such as the MPEG4 Huffmann DC frequency component tables), the decoding tables meant for decoding the AC frequency components are used instead. Other than these changes, the decompression procedure is the same.

Once decoded, the pixel values of each pixel of the difference block are added to corresponding pixel values of the correspondingly located block of the decoded and warped keyframe image (process action 814). The result of this last action is a restored approximation of the selected block of the non-keyframe image. This restored block is then inserted into the decompressed frame being constructed at the assigned location of that block (process action 816). This location can be determined by the order in which the blocks were compressed.

If, however, it is found that the selected block is a direct block, it is decoded using a different modified version of the I-frame decompression technique (process action 818). The modification in this case involves changing the inverse DC prediction step of the decompression process. More particularly, in performing the inverse DC frequency component prediction step, it is first determined whether each of the adjacent blocks that are to be used to restore the DC frequency component of the direct block being decompressed is a direct block or a difference block, respectively. If the adjacent block is a direct block, its DC frequency component is employed as is normally done in the inverse DC frequency component prediction step. However, if the adjacent block is a difference block, its DC component is ignored and instead a prescribed mid-range DC frequency component value is employed in the inverse step. Once the selected direct block has been decoded it is used to construct part of the decompressed non-keyframe image. More particularly, in process action 820, the decoded block is inserted into the decompressed frame being constructed at the assigned location of that block (as can be determined by the order in which the blocks were compressed—such as raster order in tested embodiments).

Process actions 808 through 820 are repeated 822 until all the blocks are decoded, at which time the decompression process end. The result is a restored approximation of the original non-keyframe image.

1.2.2.3.1 Decompression of Non-Keyframe Main Layers Encoded Using Multi-Directional Prediction The decompression of the encoded main layer of non-keyframes that have been compressed using the previously-described multi-directional variation of the spatial prediction compression technique will now be presented. The non-keyframe images of each set of contemporaneous frames are decompressed using the keyframes of the set that was employed as reference frames in compressing the non-keyframe image under consideration. Thus, the keyframes are decompressed first as described previously.

Figure 20A:
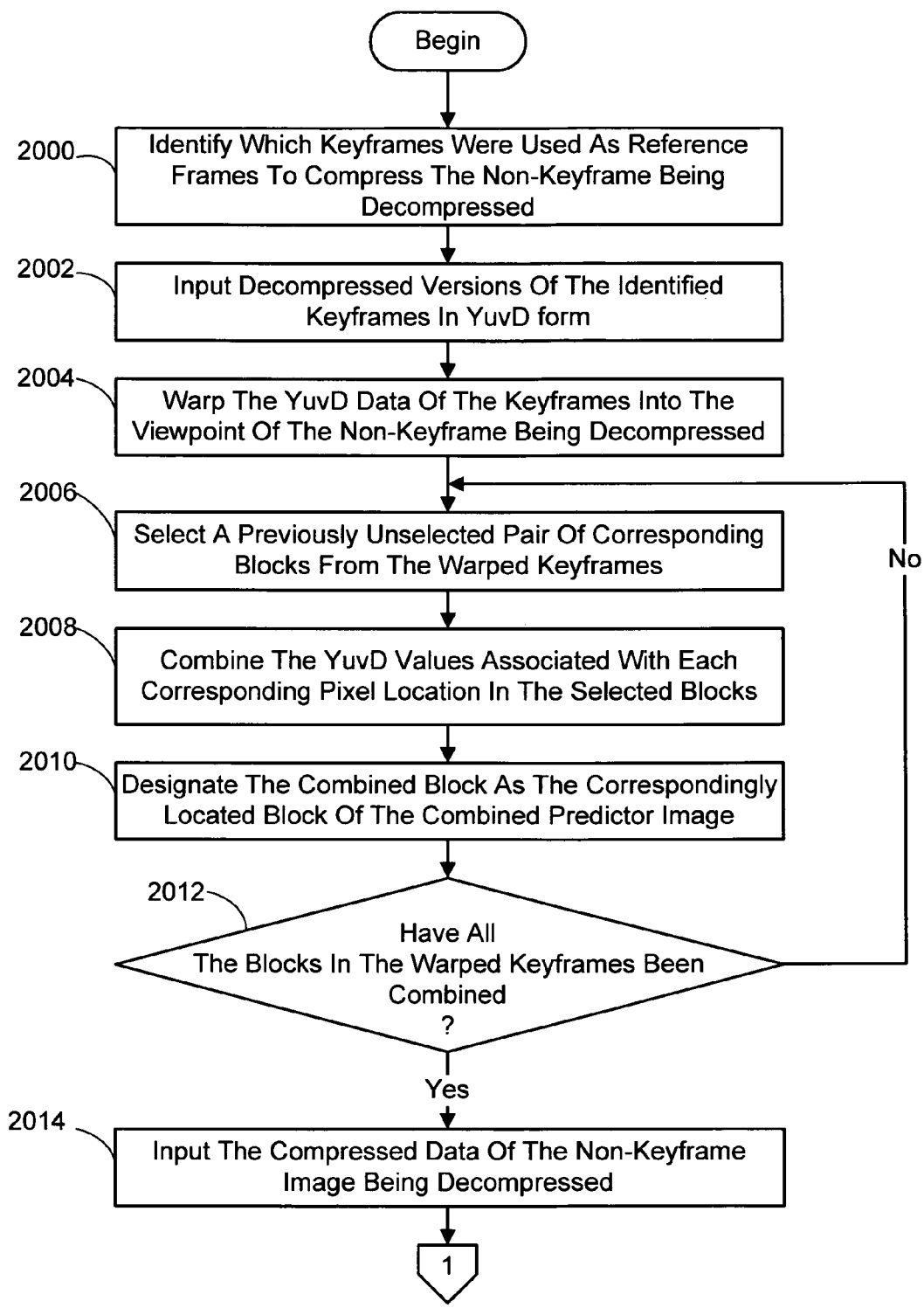
FIGS. 20A and 20B diagram a process for decompressing non-keyframe images using a multi-directional spatial decompression technique according to the present invention.
Figure 20B:
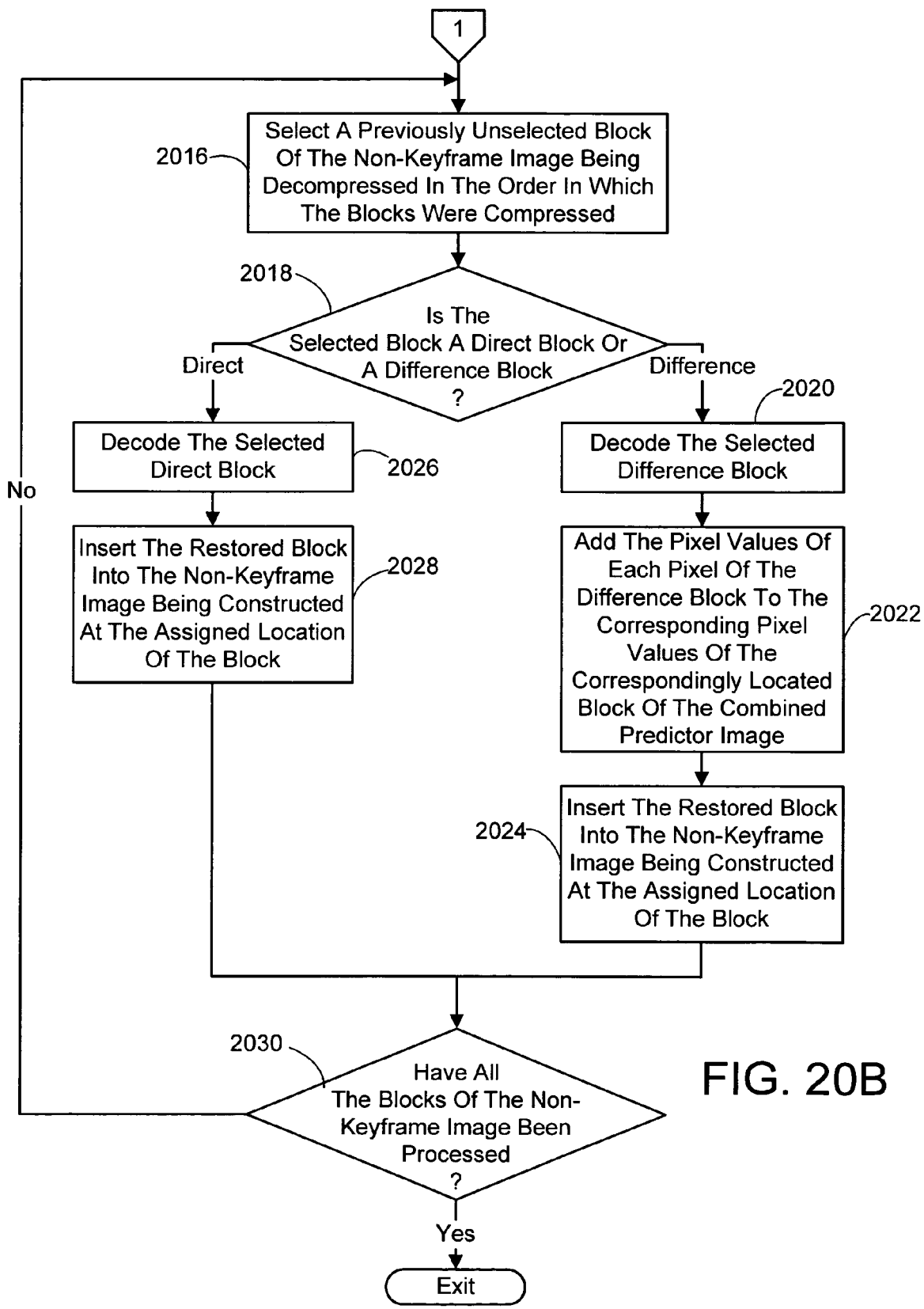

More particularly, referring to FIGS. 20A-B, for each non-keyframe in each set of contemporaneous frames, it is first determined which keyframes of the set were employed as its reference frames using the aforementioned identification data included in the compressed non-keyframe data (process action 2000). Decompressed versions of these keyframes are then input (process action 2002) with their pixel data in YuvD form. The disparity data (D) of the keyframes, and the camera parameters (which are included in the compressed video data) of the cameras used to capture the keyframes and the non-keyframe being decompressed, are then used to transform both the texture and disparity data (YuvD) into the viewpoint of the non-keyframe being decompressed (process action 2004). As with the compression of the non-keyframe images, the process used to "warp" the main layer of the identified keyframes to the viewpoint of the non-keyframe being decompressed is accomplished using conventional methods.

A pair of corresponding blocks are then selected from each of the warped keyframes (process action 2006) and the YuvD values associated with each corresponding pixel location in the selected blocks are combined (process action 2008). The resulting combined block is designated as the correspondingly-located block of the previously described combined predictor image (process action 2010). It is next determined if there are any remaining blocks in the warped keyframes that have not been combined (process action 2012). If so, then process actions 2006 through 2012 are repeated until all the blocks have been processed.

Meanwhile, the compressed non-keyframe image data associated with the non-keyframe being decompressed is input (process action 2014). As discussed in connection with the compression of the non-keyframe data, a block mode designator for each prescribed-sized block of the image is included in the non-keyframe data. A previously unselected block of the non-keyframe being decompressed is then selected in a prescribed order matching the order the blocks were compressed (process action 2016). A raster order is used in tested embodiments. It is next determined if the selected block is a direct block or a difference image block using the block mode designator (process action 2018). If it is found that the selected block is a difference image block, it is decoded using a modified version of the I-frame decompression technique described previously in connection with the decompression of certain keyframes, (process action 2020). These modifications involve skipping the inverse DC prediction step as the prediction procedure was not done in compressing the data. In addition, instead of using the standard decoding tables to decode the DC component (such as the MPEG4 Huffmann DC frequency component tables), the decoding tables meant for decoding the AC frequency components are used instead.

Once decoded, the pixel values of each pixel of the difference block are added to corresponding pixel values of the correspondingly located block of the combined predictor image (process action 2022). The result of this last action is a restored approximation of the selected block of the non-keyframe image. This restored block is then inserted into the decompressed frame being constructed at the assigned location of that block (process action 2024). This location can be determined by the order in which the blocks were compressed.

If, however, it is found that the selected block is a direct block, it is decoded using a different modified version of the I-frame decompression technique (process action 2026). The modification in this case involves changing the inverse DC prediction step of the decompression process. More particularly, in performing the inverse DC frequency component prediction step, it is first determined whether each of the adjacent blocks that are to be used to restore the DC frequency component of the direct block being decompressed is a direct block or a difference block, respectively. If the adjacent block is a direct block, its DC frequency component is employed as is normally done in the inverse DC frequency component prediction step. However, if the adjacent block is a difference block, its DC component is ignored and instead a prescribed mid-range DC frequency component value is employed in the inverse step. Once the selected direct block has been decoded it is used to construct part of the decompressed non-keyframe image. More particularly, in process action 2028, the decoded block is inserted into the decompressed frame being constructed at the assigned location of that block (as can be determined by the order in which the blocks were compressed—such as raster order in tested embodiments).

Process actions 2016 through 2028 are repeated 2030 until all the blocks are decoded, at which time the decompression process ends. The result is a restored approximation of the original non-keyframe image.

Figure 21:
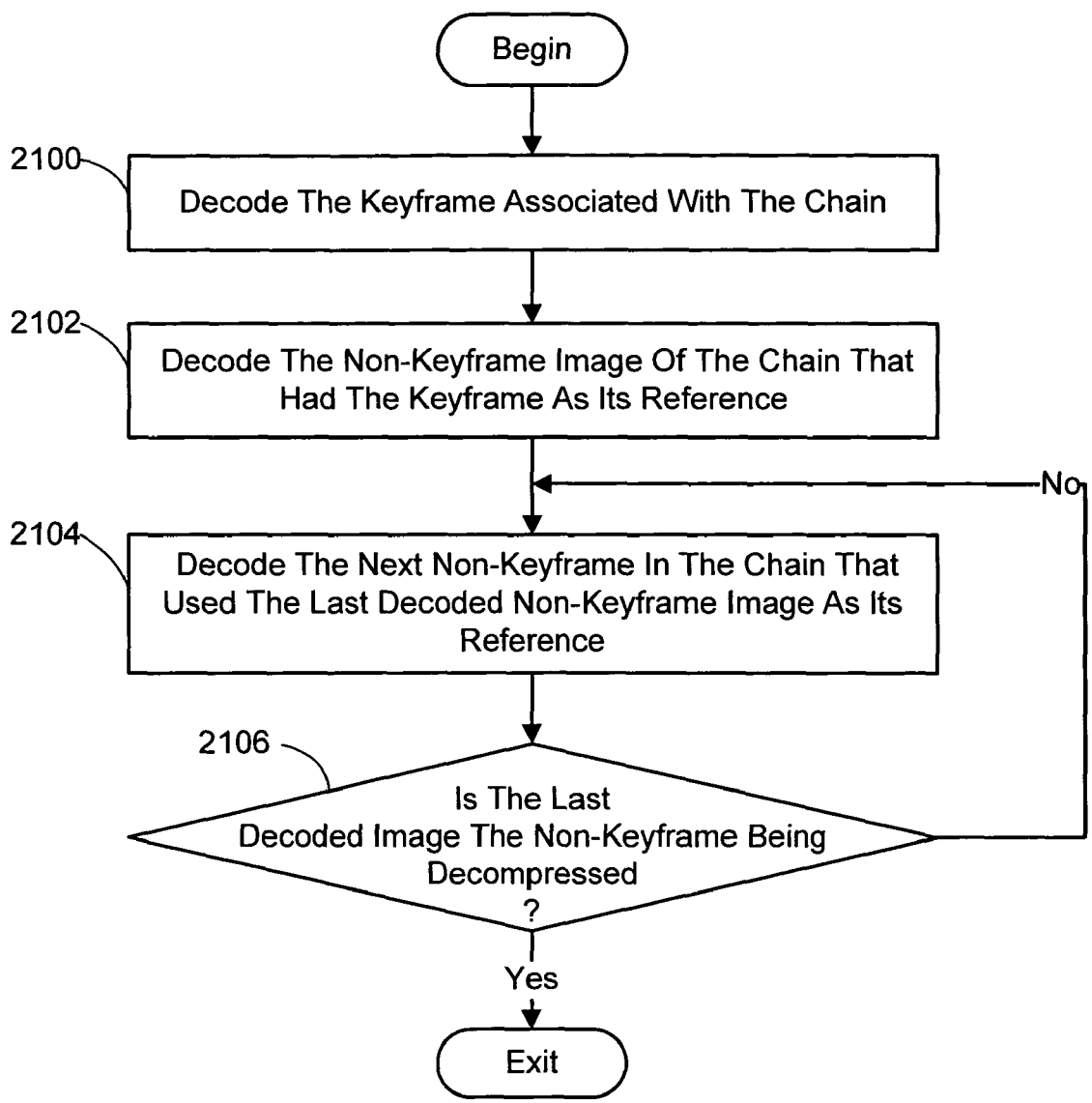
FIG. 21 diagrams a reverse chaining process according to the present invention used in conjunction with decompressing a non-keyframe image which was compressed using a chain-based spatial prediction technique.

1.2.1.3.2 Decompression of Non-Keyframe Main Layers Encoded Using Chain-Based Spatial Prediction The decompression of the encoded main layer of non-keyframes that have been compressed using one of the previously-described chain-based spatial prediction techniques is essentially accomplished in the same way as the corresponding spatial prediction techniques that use only keyframes as reference images (e.g., single direction or multi-directional), with the exception that all the images in the chain leading to the image being decompressed must be decoded first. More particularly, referring to FIG. 21, this reverse chaining procedure involves first decoding the keyframe associated with the chain (process action 2100). This is followed by decoding the non-keyframe image of the chain that had the keyframe as its reference (process action 2102). The next non-keyframe in the chain, which might be the image it is desired to decompress and which used the last decoded non-keyframe image as its reference, is then decoded (process action 2104). If necessary, this last action is repeated until the reference image used to encode the non-keyframe being decompressed is decoded. Thus, in process action 2106, it is determined if the last decode image is the non-keyframe being decompressed. If so, then the process ends. If not, then process actions 2104 and 2106 are repeated, as shown in FIG. 21.

In order to accomplish the foregoing decoding sequence, the decompression process needs the identity of the keyframe anchoring the chain and each non-keyframe link in the chain, along with the sequence the images are to be decoded. This is provided with the encoded difference data associated with the non-keyframe being decompressed as indicated previously, and so is simply read as part of the decompression process.

1.2.2.4 Decompression of Boundary Layer Data

Figure 9A:
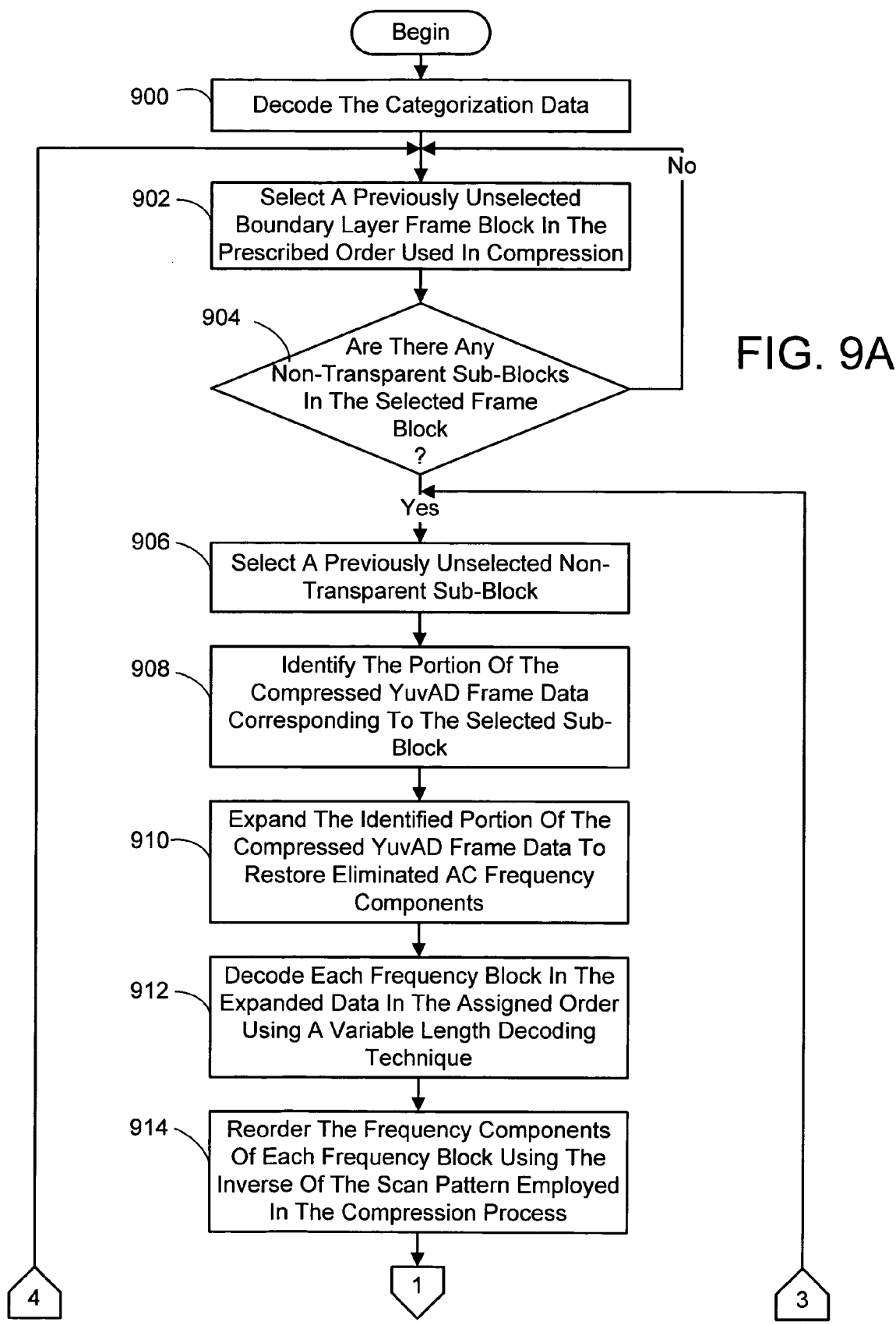
Figure 9C:
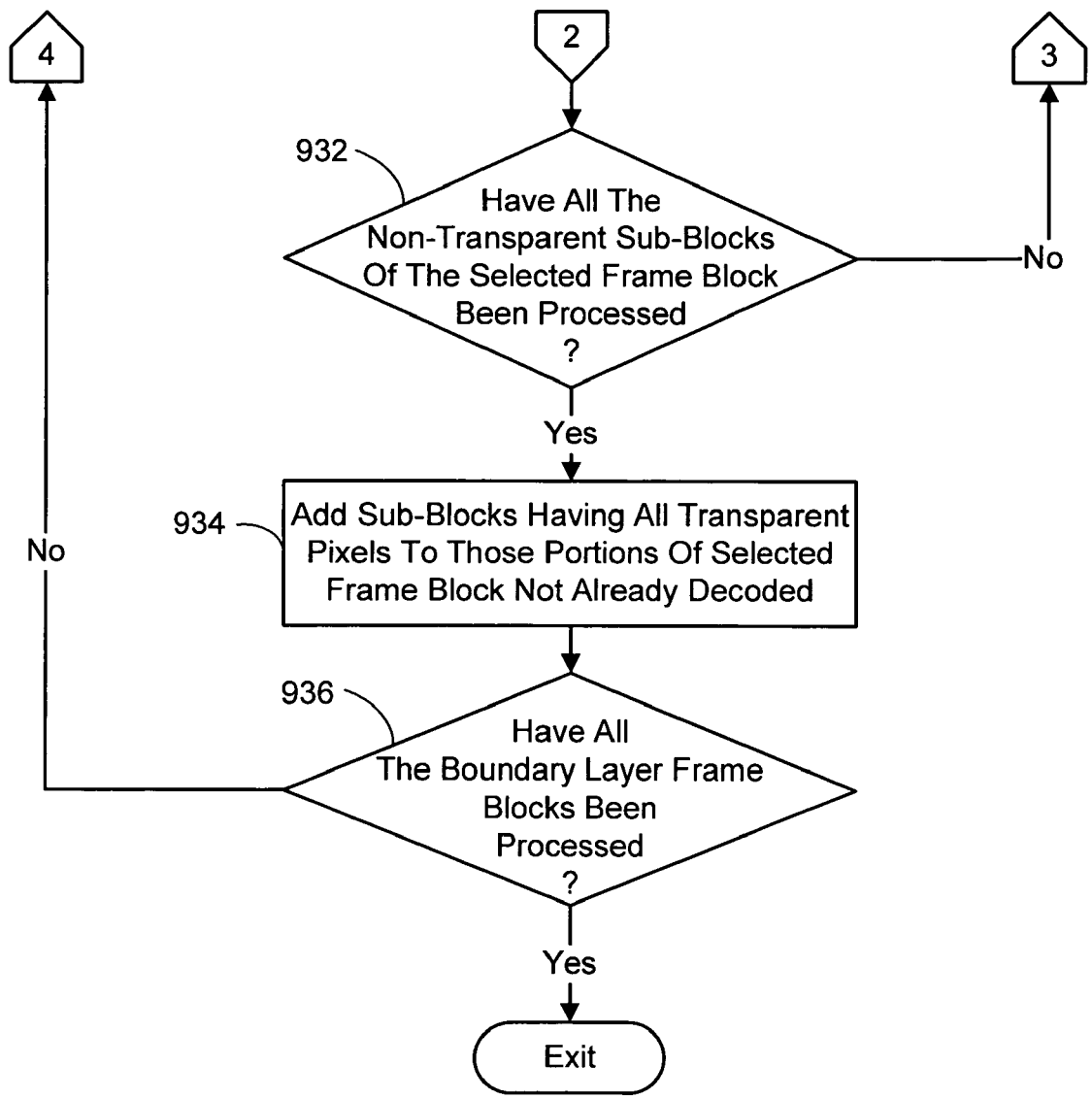

The decompression of encoded boundary layers that have been compressed using the previously described non-predictive I-frame approach will now be presented. Referring to FIGS. 9A-C, the decompression process begins by decoding the categorization data included in the compressed frame data (process action 900). This entails applying the particular decoding procedure applicable to the procedure used to compress the categorization data (e.g., a Huffmann encoding technique in the tested embodiments), and then performing an inverse quadtree procedure to obtain the category (i.e., T, O or P) assigned to each of the prescribed sized blocks used in the compression process (e.g., 8×8 in tested embodiments).

As described previously, the compression of boundary layer frames includes eliminating the transparent sub-blocks prior to encoding. The decoded categorization data is used to identify these eliminated sub-blocks so that they can eventually be restored and to identify the order in which sub-blocks are to be found in the encoded YuvAD data. To this end, in process action 902, a previously unselected frame block of the same size employed in the compression process is selected in a prescribed order used in the compression. In tested embodiments, the frame blocks were each 16×16 pixels and a raster order was used. It is then determined from the categorization data if there are any non-transparent sub-blocks of the size used in the compression process contained in the selected block (process action 904). In tested embodiments, the sub-blocks were 8×8 quadrant blocks. If there are no non-transparent sub-blocks found, then process actions 902 and 904 are repeated. When a frame block having non-transparent sub-blocks is found, a previously unselected one of its non-transparent sub-block(s) is selected, and in the order used in compression (e.g., raster order in tested embodiments) if there are more than one (process action 906). The portion of the compressed YuvAD data corresponding to the selected sub-block is then identified using the CBP header of the frame block under consideration (process action 908).

At this point, the decompression procedure becomes similar to that used to decode main layer keyframes that were compressed using the non-predictive I-frame technique. More particularly, the identified portion of compressed data is first expanded by adding zeros whenever the CBP header associated with the frame block under consideration indicates that zero-value AC components have been deleted from the encoded frequency block data associated with the selected sub-block (process action 910). The expanded data is then decoded in process action 912 using the particular decoding procedure appropriate for the type of encoding used (e.g., Huffmann encoding in tested embodiments). The inverse of the scan pattern employed in the compression process (e.g., inverse zigzag in tested embodiments) is used to reorder the decoded frequency components to reproduce the original frequency block (process action 914). Inverse DC component prediction and inverse quantization procedures are then performed (process action 916) to produce the original DC component of the selected frequency block. Next, an inverse DCT is performed to produce an approximation of the original Y, u, v, A and D values of the selected sub-block (process action 918). The resulting u and v sub-block planes are upsampled to bring them back to their original size (e.g., 16×16) in process action 920. The quadrant of the upsampled u and v planes corresponding to the selected sub-block is then designated as the u and v planes for that sub-block (process action 922). Thus, at this point in the decompression process there are Y, u, v, A and D values decoded for each pixel of the selected sub-block.

Next, the Yuv pixel values of the selected sub-block are converted back to RGB values (process action 924) so that RGBAD values are specified for each pixel of the sub-block. It is then determined if the selected sub-block is categorized as a partial block (process action 926). In compressing the boundary layer data the partial sub-blocks were put through a repetitive padding technique as described previously. To remove this extraneous data, the binary mask generated for the sub-block and included in the compressed frame data is reproduced using a decoding procedure appropriate for the type of encoding used in the compression process (e.g., Huffmann encoding in tested embodiments) followed by an inverse quadtree procedure (process action 928). The decoded mask is then applied to the selected partial sub-block such that all the non-opaque pixels are made transparent (process action 930).

Process actions 906 through 930 are repeated 932 for each remaining non-transparent sub-block. At this point, all the non-transparent sub-blocks of the selected frame block have been decompressed. As it is known that any other sub-blocks of the frame block are totally transparent, in process action 934, sub-blocks having all transparent pixels are added. Process actions 902 through 934 are repeated 936 until all the boundary layer frame blocks have been considered. The decompression process then ends.

What is claimed is:

1. A computer-implemented process for compressing video data comprising sequential sets of contemporaneous video frames wherein the video frames in a set depict substantially the same scene from different viewpoints, said process comprising:

using a computer to perform the following process actions:

designating a plurality of keyframes for each set of contemporaneous frames such that no non-keyframe in a set has a viewpoint that is more than a prescribed number of viewpoints away from the viewpoint of at least two designated keyframes; and for each set of contemporaneous video frames in time sequence order, compressing each video frame that is not a keyframe using at least two keyframes which are no more than said prescribed number of viewpoints away from the non-keyframe being compressed as reference frames for a multi-directional spatial prediction compression technique.

2. The process of claim 1, wherein each set of contemporaneous video frames depict substantially the same scene from different viewpoints that are arranged in a grid of viewpoints.

3. The process of claim 1, wherein each set of contemporaneous video frames depict substantially the same scene from different viewpoints arranged in a row of viewpoints.

4. The process of claim 1, wherein the process action of compressing each non-keyframe video frame within each set of contemporaneous frames comprises the action of compressing each non-keyframe by encoding pixel data comprising at a minimum, pixel color values as well as pixel disparity or depth values, and wherein the process action of using at least two keyframes which are no more than said prescribed number of viewpoints away from the non-keyframe being compressed as reference frames for the multi-directional spatial prediction compression technique, comprises:

(a) selecting a previously un-selected keyframe within the prescribed number of viewpoints from the non-keyframe being compressed;

(b) inputting pixel data of the selected keyframe;

(c) converting the pixel color values of the selected keyframe into Yuv values;

(d) inputting camera parameters indicative of the location, orientation and camera attributes of the cameras used to capture the selected keyframe and the non-keyframe being compressed;

(e) warping the selected keyframe into the viewpoint of the non-keyframe being compressed using the disparity of depth values (D) of the identified keyframe and the camera parameters of the cameras used to capture the keyframe and the non-keyframe being compressed;

(f) repeating actions (a) through (e) for a prescribed number of keyframes;

(g) combining the warped keyframes to produce a combined predictor image;

(h) identifying pixels of the combined predictor image not having YuvD values;

(i) generating a binary mask which for each pixel location of the combined predictor image has one binary value if YuvD pixel values are available and the other binary value if no YuvD values exist;

(j) dilating the regions of the binary mask indicating there are no YuvD values available by a prescribed number of pixels;

(k) dividing the binary mask into a grid of prescribed-sized blocks;

(l) establishing a mode designation for each block, which indicates if any of the binary mask pixels in that block have the second binary value associated with a region wherein no YuvD values exist;

(m) subtracting the pixel values of each pixel of the combined predictor image from the like-type values of the corresponding pixels of the non-keyframe image being compressed, to produce a difference image;

(n) segmenting the non-keyframe being compressed and the difference image in blocks of the same size as that used to divide the binary mask;

(o) for each correspondingly located block of the non-keyframe and difference image, considered in a prescribed order, determining if the block is associated with a region of the combined predictor image comprising pixels with no YuvD values using the mode designation of the block, whenever it is found that the block is associated with a region of the combined predictor image comprising pixels with no YuvD values, encoding the block of the non-keyframe using a version of an I-frame compression technique in which a DC frequency component prediction phase uses prescribed mid-range DC frequency component values in lieu of actual values associated with adjacent blocks whenever the adjacent block's pixels all have YuvD values, whenever it is found that the block is associated with a region of the combined predictor image comprising pixels all having YuvD values, encoding the block of the difference image using a version of an I-frame compression technique in which a DC frequency component prediction phase is skipped and AC frequency component encoding tables are used to encode the DC frequency component, and appending the mode designation of the block to the encoded block data; and (p) appending the identities of the keyframes used to produce the combined predictor image to the encoded data associated with the compressed non-keyframe.

5. The process of claim 4, wherein the process action of combining the warped keyframes to produce a combined predictor image, comprises, for each set of correspondingly located blocks of the warped keyframes, the actions of:

combining the YuvD values associated with each corresponding pixel location in the blocks under consideration, said combining comprising, for each pixel location in the set of blocks under consideration, individually averaging the Y, u, v, and D values for those corresponding pixel locations that have YuvD values associated therewith, whenever at least two of the corresponding pixel locations have YuvD values associated therewith, adopting the YuvD values of a pixel location of a block that has YuvD values associated therewith as the combined YuvD values for that location, whenever said block is the only one in the set of blocks under consideration that has YuvD values associated with the pixel location, and assigning no YuvD values to a pixel location of the set of blocks, whenever there are no YuvD values associated with that pixel location in any of the blocks making up the set; and designating the resulting combined block as a correspondingly-located block of the combined predictor image.

6. A computer readable storage medium, which does not consist of a signal, and having computer-executable instructions stored thereon for performing the process actions recited in claim 1.

7. A computer-implemented process for decompressing video data comprising sequential sets of contemporaneous video frames wherein the video frames in a set depict substantially the same scene from different viewpoints, wherein said video data has been compressed by, designating a plurality of keyframes for each set of contemporaneous frames such that no non-keyframe in a set has a viewpoint that is more than a prescribed number of viewpoints away from the viewpoint of at least two designated keyframes, and for each set of contemporaneous video frames in time sequence order, compressing each video frame that is not a keyframe using at least two keyframes which are no more than said prescribed number of viewpoints away from the non-keyframe being compressed as reference frames for a multi-directional spatial prediction technique, said process comprising:

using a computer to perform a process action of decompressing each non-keyframe within each set of contemporaneous frames using at least two keyframes which are no more than said prescribed number of viewpoints away from the non-keyframe being decompressed as reference frames for a multi-directional spatial prediction decompression technique.

8. The process of claim 7, wherein each non-keyframe video frame within each set of contemporaneous frames is compressed by encoding pixel data comprising at a minimum, pixel color values as well as pixel disparity or depth values, and wherein the process action of decompressing each non-keyframe video frame within each set of contemporaneous frames using at least two keyframes which are no more than said prescribed number of viewpoints away from the non-keyframe being decompressed as reference frames for the multi-directional spatial prediction decompression technique, comprises the actions of:
  (a) selecting a previously un-selected keyframe that was employed as a reference frame during the compression of the non-keyframe being decompressed;
  (b) inputting a decompressed version of the selected keyframe with its pixel data in YuvD form;
  (d) inputting camera parameters indicative of the location, orientation and camera attributes of the cameras used to capture the selected keyframe and the non-keyframe being decompressed;
  (e) warping the selected keyframe into the viewpoint of the non-keyframe being decompressed using the disparity of depth values (D) of the selected keyframe and the camera parameters of the cameras used to capture the keyframe and the non-keyframe being decompressed;
  (f) repeating actions (a) through (e) for the remaining previously unselected keyframes employed as reference frames during the compression of the non-keyframe being decompressed;
  (g) combining the warped keyframes to produce a combined predictor image;
  (h) identifying pixels of the combined predictor image not having YuvD values;
  (i) inputting compressed data associated with the non-keyframe being decompressed which comprises a mode designator for each prescribed-sized block of the non-keyframe that indicates if any of the pixels in a correspondingly located block of the combined predictor image have no YuvD values;
  (j) for each block of the non-keyframe being decompressed, considered in a prescribed order matching the order in which the blocks were compressed,
    whenever the mode designator for the block indicates the correspondingly located block of the combined predictor image has YuvD values for every pixel thereof,
      decoding the block using a modified version of an I-frame decompression technique in which an inverse DC frequency component prediction step is skipped and AC frequency component decoding tables are used to decode the DC frequency component, and
      adding the pixel values of each pixel of the decoded block to the like-type values of the corresponding pixels of the corresponding block of the combined predictor image to produce a decoded block of the non-keyframe video frame being decompressed;
    whenever the mode designator for the block indicates the correspondingly located block of the warped keyframe has pixels with no YuvD values, decoding the block using a different modified version of an I-frame decompression technique in which a DC frequency component prediction phase uses prescribed mid-range DC frequency component values in lieu of actual values associated with adjacent blocks if the adjacent block's pixels all have YuvD values, and
    assigning the decoded block to a location in the decompressed non-keyframe corresponding to its location in the original non-keyframe.

9. The process of claim 8, wherein the process action of combining the warped keyframes to produce a combined predictor image, comprises, for each set of correspondingly located blocks of the warped keyframes, the actions of:
  combining the YuvD values associated with each corresponding pixel location in the blocks under consideration, said combining comprising, for each pixel location in the set of blocks under consideration,
    individually averaging the Y, u, v, and D values for those corresponding pixel locations that have YuvD values associated therewith, whenever at least two of the corresponding pixel locations have YuvD values associated therewith,
    adopting the YuvD values of a pixel location of a block that has YuvD values associated therewith as the combined YuvD values for that location, whenever said block is the only one in the set of blocks under consideration that has YuvD values associated with the pixel location, and
    assigning no YuvD values to a pixel location of the set of blocks, whenever there are no YuvD values associated with that pixel location in any of the blocks making up the set; and
  designating the resulting combined blocks as a correspondingly-located block of the combined predictor image.

10. A computer readable storage medium, which does not consist of a signal, and having computer-executable instructions stored thereon for performing the process actions recited in claim 7.

* * * * *